United States Patent
Wang et al.

(10) Patent No.: US 10,420,041 B2
(45) Date of Patent: *Sep. 17, 2019

(54) WIFI EFFICIENT NETWORK TRANSITION

(71) Applicant: INTERDIGITAL PATENT HOLDINGS, INC., Wilmington, DE (US)

(72) Inventors: Xiaofei Wang, Cedar Grove, NJ (US); Guodong Zhang, Woodbury, NY (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,966

(22) Filed: Aug. 13, 2018

(65) Prior Publication Data
US 2018/0368079 A1    Dec. 20, 2018

Related U.S. Application Data

(63) Continuation of application No. 15/123,829, filed as application No. PCT/US2015/020220 on Mar. 12, 2015, now Pat. No. 10,051,581.
(Continued)

(51) Int. Cl.
*H04W 52/34* (2009.01)
*H04W 48/14* (2009.01)
(Continued)

(52) U.S. Cl.
CPC ........... *H04W 52/34* (2013.01); *H04W 48/08* (2013.01); *H04W 48/14* (2013.01);
(Continued)

(58) Field of Classification Search
CPC ..... H04W 48/14; H04W 84/12; H04W 48/08; H04W 48/12; H04W 52/241; H04W 52/34; H04W 48/10; Y02B 60/50
(Continued)

(56) References Cited

U.S. PATENT DOCUMENTS 8,385,243 B2    2/2013  Sridhara et al.
8,761,134 B2    6/2014  Grokop et al.
(Continued)

FOREIGN PATENT DOCUMENTS

JP    2013/153281    8/2013
WO    2013/101679    7/2013
WO    2013/190168    12/2013

OTHER PUBLICATIONS

Aboul-Magd, "802.11 HEW SG Proposed 5 Criteria," IEEE P802.11 Wireless LANs, IEEE 802.11-14/0166r0 (Sep. 2014).
(Continued)

*Primary Examiner* — Robert J Lopata
(74) *Attorney, Agent, or Firm* — Volpe and Koenig, P.C.

(57) ABSTRACT

A method and apparatus may be used to perform efficient network transitions. One or more of Probe Request frames that an AP may receive or process as valid may be modified by including a transmit power for the Probe Request frame. A Probe Request frame may be transmitted at less than full power. BSS transitions may be enhanced by indicating reasons for the transition, security information, or quality of service (QoS) information. Overhead associated with tracking long-sleeping STAs may be managed through the use of multiple values for a maximum idle period in a BSS.

20 Claims, 21 Drawing Sheets

Related U.S. Application Data

(60) Provisional application No. 61/953,385, filed on Mar. 14, 2014.

(51) Int. Cl.
*H04W 48/08* (2009.01)
*H04W 52/24* (2009.01)
*H04W 84/12* (2009.01)
*H04W 48/12* (2009.01)

(52) U.S. Cl.
CPC .......... *H04W 52/241* (2013.01); *H04W 48/12* (2013.01); *H04W 84/12* (2013.01)

(58) Field of Classification Search
USPC .................................................. 370/338
See application file for complete search history.

(56) References Cited

U.S. PATENT DOCUMENTS

| | | | |
|---|---|---|---|
| 8,792,394 B2 | 7/2014 | Nagara | |
| 9,433,022 B2 | 8/2016 | Park et al. | |
| 2008/0298333 A1 | 12/2008 | Seok | |
| 2010/0118830 A1* | 5/2010 | Stephenson | H04L 63/10 370/331 |
| 2010/0238879 A1* | 9/2010 | Jeon | H04W 52/08 370/329 |
| 2011/0183683 A1* | 7/2011 | Das | H04W 60/00 455/456.1 |
| 2012/0275320 A1* | 11/2012 | Iyer | H04W 16/14 370/252 |
| 2012/0315853 A1* | 12/2012 | Lambert | H04W 8/005 455/41.2 |
| 2012/0322481 A1* | 12/2012 | Laroche | H04W 48/16 455/509 |
| 2013/0077505 A1 | 3/2013 | Choudhary et al. | |
| 2013/0231151 A1* | 9/2013 | Kneckt | H04W 40/246 455/515 |
| 2013/0294354 A1* | 11/2013 | Zhang | H04W 72/04 370/329 |
| 2014/0003282 A1 | 1/2014 | Kafle et al. | |
| 2014/0211703 A1* | 7/2014 | Seok | H04W 52/367 370/329 |
| 2014/0301208 A1* | 10/2014 | Merlin | H04W 28/0273 370/236 |
| 2015/0009902 A1* | 1/2015 | Emmanuel | H04W 52/283 370/329 |
| 2015/0063336 A1* | 3/2015 | Cherian | H04W 24/02 370/338 |
| 2015/0131641 A1* | 5/2015 | Ong | H04W 48/20 370/338 |
| 2015/0146548 A1* | 5/2015 | Wang | H04W 52/04 370/252 |
| 2015/0146704 A1* | 5/2015 | Yoon | H04W 48/14 370/338 |
| 2015/0281908 A1* | 10/2015 | Venkatraman | H04W 4/04 455/456.6 |
| 2016/0066227 A1* | 3/2016 | Townend | H04W 48/20 370/331 |

OTHER PUBLICATIONS

Aboul-Magd, "802.11 HEW SG Proposed PAR," IEEE P802.11 Wireless LANs, IEEE 802.11-14/0165r0 (Sep. 2014).

Draft Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 7: Fast Initial Link Setup, IEEE P802.11ai D1.1 (Sep. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 2: Fast Basic Service Set (BSS) Transition, IEEE Std. 802.11r-2008 (Jul. 15, 2008).

Kneckt et al., "802.11ai—Improving WLAN System Performance," IEEE 802.11-13/1325r4 (Nov. 6, 2013).

Siep et al., "Specification Framework for TGai," IEEE P802.11 Wireless LANs, IEEE 802.11-12/0151r7 (Jan. 2011).

Yunoki et al., "Some Findings from Real World Measurement," IEEE 11-14/0061r0 (Jan. 2014).

* cited by examiner

WIFI EFFICIENT NETWORK TRANSITION

CROSS REFERENCE TO RELATED APPLICATIONS

This application is a continuation of U.S. application Ser. No. 15/123,829, filed Sep. 6, 2016 which is the U.S. National Stage, under 35 U.S.C. § 371, of International Application No. PCT/US2015/020220 filed Mar. 12, 2015, which claims the benefit of U.S. Provisional Application No. 61/953,385, filed Mar. 14, 2014, all of which are hereby incorporated by reference herein.

BACKGROUND

A WLAN in infrastructure basic service set (BSS) mode may have an Access Point (AP) for the BSS and one or more stations (STA) associated with the AP. The AP typically may have access or interface to a distribution system (DS) or another type of wired/wireless network that carries traffic in and out of the BSS. Traffic to STAs that originates from outside the BSS may arrive through the AP and be delivered to the STAs. Traffic originating from STAs to destinations outside the BSS may be transmitted to the AP to be delivered to the respective destinations. Traffic between STAs within the BSS may also be transmitted through the AP where the source STA transmits traffic to the AP and the AP delivers the traffic to the destination STA. Such traffic between STAs within a BSS may be considered to be peer-to-peer traffic. Such peer-to-peer traffic may also be transmitted directly between the source and destination STAs with direct link setup (DLS) using an Institute of Electrical and Electronics Engineers (IEEE) 802.11e DLS or an 802.11z tunneled DLS (TDLS). A WLAN in Independent BSS mode may have no AP, and STAs may communicate directly with each other.

With the proliferation of personal mobile devices and applications such as meters and sensors, it is expected that future Wireless Fidelity (WiFi) systems that operate in accordance with IEEE 802.11 standards, and associated APs, may require support for a much larger number of devices than those currently in operation. The required number of STAs that may need to be supported may be much more than the current limitation of 2,007 devices per BSS. For example, in IEEE 802.11ah, it may be required to support up to 6,000 devices per BSS. Dense STA and AP deployment may also be possible.

New spectrum is being allocated in various countries around the world for wireless communication systems such as WLANs. Channels allocated in this spectrum may often be quite limited in size and bandwidth. In addition, the spectrum may be fragmented in that available channels may not be adjacent, and it may not be possible to combine them to support larger transmission bandwidths. Such may be the case for example in spectrum allocated below 1 GHz in various countries. WLAN systems, for example based on IEEE 802.11, may be designed to operate in such spectrum. Given the limitations of such spectrum, WLAN systems may only be able to support smaller bandwidths and lower data rates compared to high throughput/very high throughput (HT/VHT) WLAN systems, for example, based on IEEE 802.11n/802.11ac.

SUMMARY

Methods and apparatus may be used to perform efficient network transitions. The number of Probe Request frames that an AP may receive or process as valid may be modified by setting a transmit power for the Probe Request frames instead of using full transmit power. BSS transitions may be enhanced by indicating reasons for the transition, security information, or quality of service (QoS) information. Overhead associated with tracking long-sleeping STAs may be managed through the use of multiple values for a maximum idle period in a BSS.

For example, an AP may include a receiver configured to receive a probe request frame from the STA. The probe request frame may include an indication of a transmitted power level. The AP may include a processor configured to determine the relative location of the STA based on the received power level of the probe request frame and the indicated transmit power level of the probe request frame. The AP may ignore any probe request frames received below a threshold based on the relative location of the STA. In some examples, the AP may ignore legacy probe request frames. The AP may process the received probe request frame based on the received power level and the transmitted power level. For example, the AP may generate a probe response frame in response to the probe request frame if the AP determines that the relative location of the STA is within the threshold or predetermined range/distance. The AP may include a transmitter configured to transmit the probe response frame.

In another example, an AP may include a receiver configured to receive a probe request frame a STA at a received power level. The probe request frame may include an indicator that indicates a transmit power level of the probe request frame. If the probe request frame does not include an indication of a transmitted power level, the AP may ignore the probe request frame when the received power level is below a first threshold. If the probe request frame includes an indication of transmit power, the AP may process the probe request frame when the received power level is greater than a second threshold that is based on the received power level and the indicated transmitted power level. The second threshold may be lower or higher than the first threshold. If the AP processes the probe request frame, the AP may transmit a probe response frame.

BRIEF DESCRIPTION OF THE DRAWINGS

A more detailed understanding may be had from the following description, given by way of example in conjunction with the accompanying drawings wherein.

DETAILED DESCRIPTION

Figure 1A:
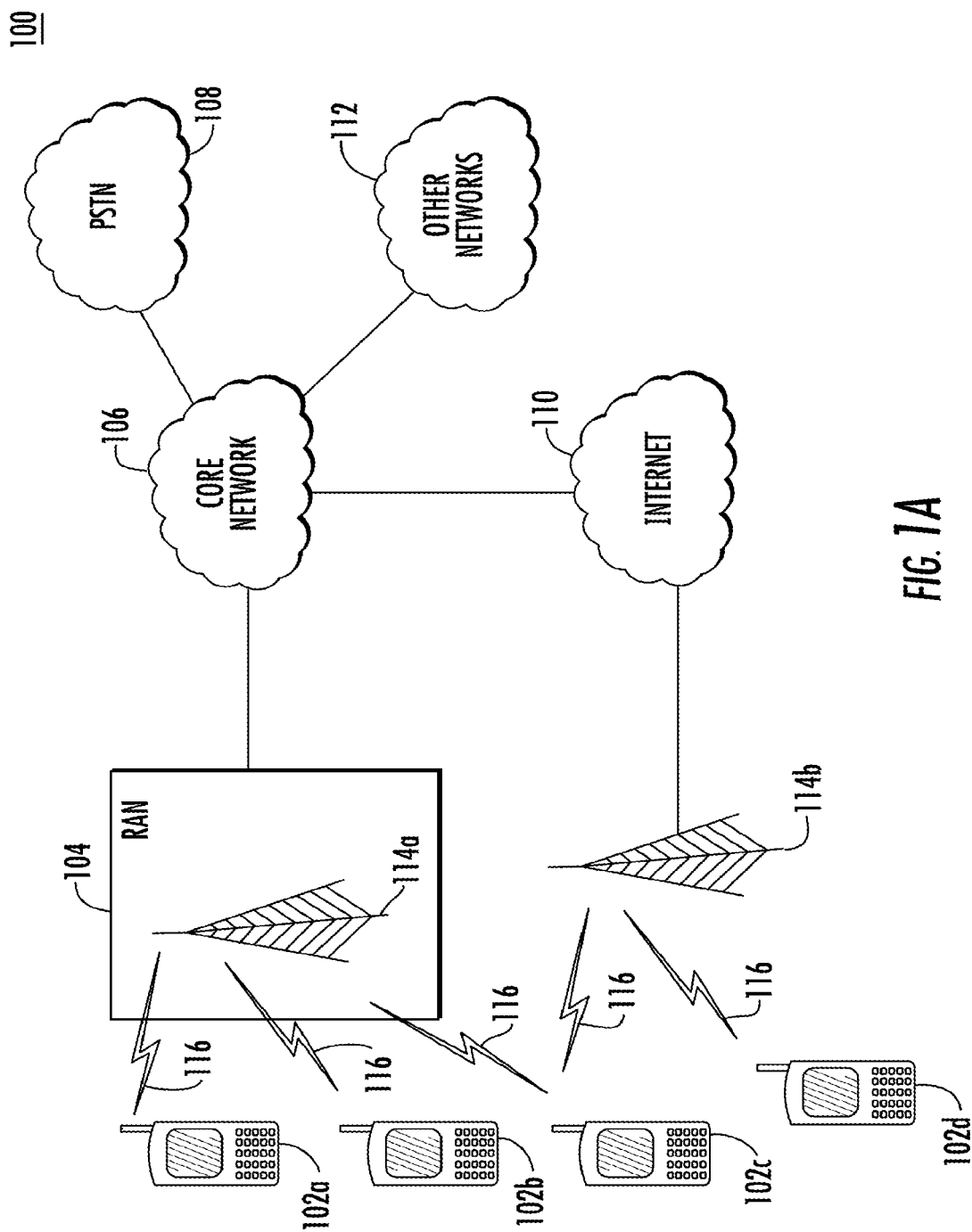
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal frequency division multiplexing (OFDM), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDM, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
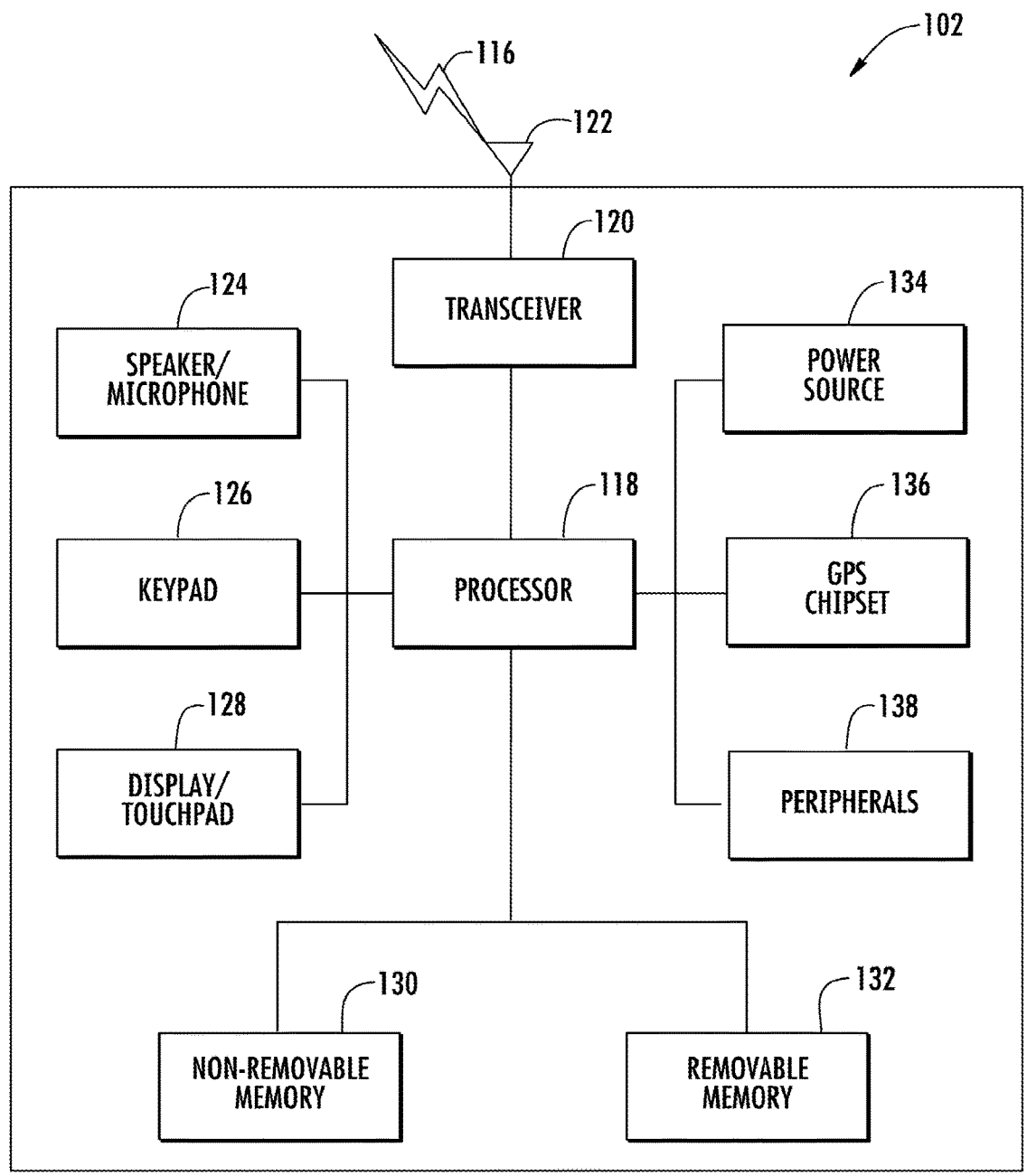
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
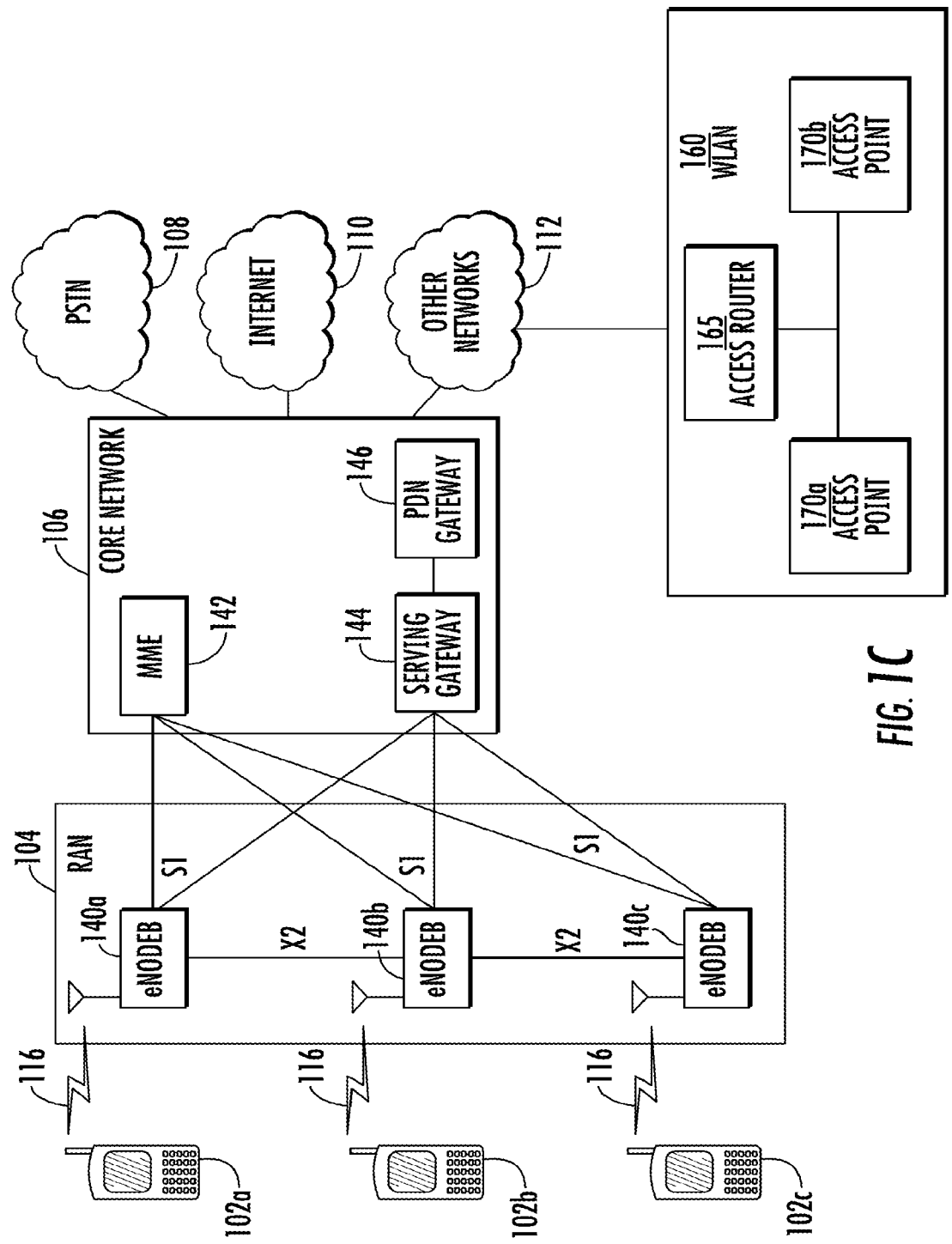
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Herein, the terminology "STA" includes but is not limited to a wireless transmit/receive unit (WTRU), a user equipment (UE), a mobile station, a fixed or mobile subscriber unit, a pager, a cellular telephone, a personal digital assistant (PDA), a computer, a mobile internet device (MID) or any other type of user device capable of operating in a wireless environment. When referred to herein, the terminology "AP" includes but is not limited to a base station, a Node-B or eNode-B, a site controller, or any other type of interfacing device capable of operating in a wireless environment.

The IEEE 802.11ah Task Group (TG) has been established to develop solutions to support WiFi systems in the sub 1 GHz band. The IEEE 802.11ah TG may implement the following requirements: OFDM Physcial Layer (PHY) operating below 1 GHz in license—exempt bands excluding TVWS; enhancements to medium access control (MAC) to support PHY, coexistence with other systems (e.g. 802.15.4 and P802.15.4g); and optimization of rate vs. range performance (range up to 1 km (outdoor) and data rates>100 Kbit/s).

The following use cases have been adopted by the 802.11ah TG: sensors and meters; backhaul sensor and meter data; and extended range Wi-Fi for cellular offloading. However, 802.11ah may be used in other scenarios.

The spectrum allocation in some countries may be quite limited. For example, in China the 470-566 and 614-787 MHz bands may only allow 1 MHz bandwidth. Therefore, there may be a need to support a 1 MHz only option, in addition to support for a 2 MHz mode. The 802.11ah PHY may be required to support 1, 2, 4, 8, and 16 MHz bandwidths.

The IEEE 802.11ah PHY may operate below 1 GHz and may be based on the IEEE 802.11ac PHY. To accommodate the narrow bandwidths required by IEEE 802.11ah, the IEEE 802.11ac PHY may be down-clocked by a factor of 10. While support for 2, 4, 8, and 16 MHz can be achieved by the 1/10 down-clocking described above, support for the 1 MHz bandwidth may require a new PHY definition with a Fast Fourier Transform (FFT) size of 32.

Recently, the IEEE 802.11 High Efficiency WLAN (HEW) Study Group (SG) was created to explore the scope and purpose of a possible, future amendment to enhance the Quality of Experience (QoE) for a broad spectrum of wireless users in many usage scenarios including high-density scenarios in the 2.4 GHz and 5 GHz band. Use cases that may support dense deployments of APs, and STAs, and associated Radio Resource Management (RRM) technologies may be considered by the HEW SG. Applications for HEW may include emerging usage scenarios such as data delivery for stadium events, high user density scenarios such as train stations, or enterprise/retail environments, video delivery, and wireless services for medical applications.

Figure 2:
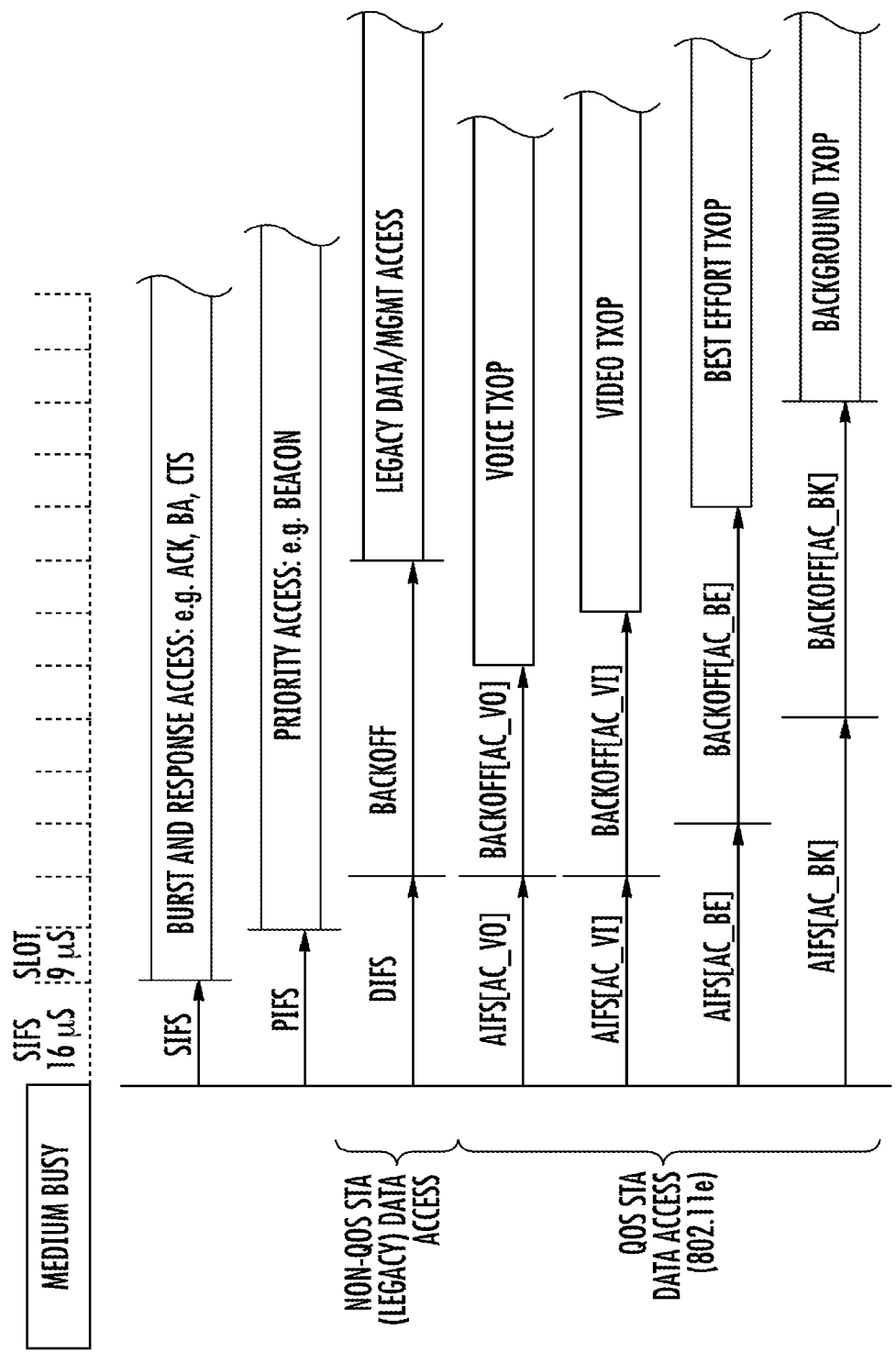
FIG. 2 is a signaling diagram illustrating an example Enhanced Distributed Channel Access (EDCA) operation.

Enhanced distributed channel access (EDCA) may be an extension of the basic Distributed Coordination Function (DCF) introduced in IEEE 802.11 to support prioritized QoS. An example operation of EDCA in IEEE 802.11n is shown in FIG. 2.

Point Coordination Function (PCF) may use contention free channel access which may include some or all of the following features. For example, PCF may support time-bounded services and polling by an AP. In another example, an AP may transmit a polling message after waiting for PIFS. In yet another example, if a client has nothing to transmit, the client may return a null data frame. Since PIFS may be smaller than DIFS, it may lock out all asynchronous traffic. PCF may be deterministic and fair, and it may be efficient for both low duty-cycle and heavy/bursty traffic. Hybrid Coordinator Function (HCF) Controlled Channel Access (HCCA), which may be an enhancement of PCF, may have some or all of the following features. For example, an AP may poll a STA during both contention period (CP) and contention-free period (CFP). In addition, the AP may transmit multiple frames under one poll.

The IEEE 802.11ai Task Group (TG) has been established to develop solutions to support fast initial link setup. The IEEE 802.11ai TG may implement the following requirements. For example, one requirement may be to support initial link setup time for STAs within 100 ms. Another example requirement may be to support at least 100 non-AP STAs simultaneously entering the BSS and fast link setup within 1 second.

The IEEE 802.11ai TG has been established to speed up the IEEE 802.11 link setup process, which is also referred to as Fast Initial Link Setup (FILS) in the standards. Since beacons may be part of the primary tools to provide information about the AP to the STAs at the very beginning of the initial link setup process, beacons could include information that may facilitate a speedy link setup in order to satisfy the functional requirements specified for IEEE 802.11ai. The FILS process may include five phases, for example AP Discovery, Network Discovery, additional Timing Synchronization Function (TSF), authentication and association, and higher layer IP setup.

Several methods may be designed to reduce the number of Probe Responses. In one example, a Probe Response frame may be transmitted as a broadcast frame to a group of STAs instead of a unicast frame to a single STA. In another example, an AP may choose to only respond to Probe Requests that exceed a certain signal to interference plus noise ratio (SINR) or signal to noise (SNR) or certain received power levels indicating that the transmitting STAs of the Probe Requests are within an acceptable range of the AP.

Figure 3:
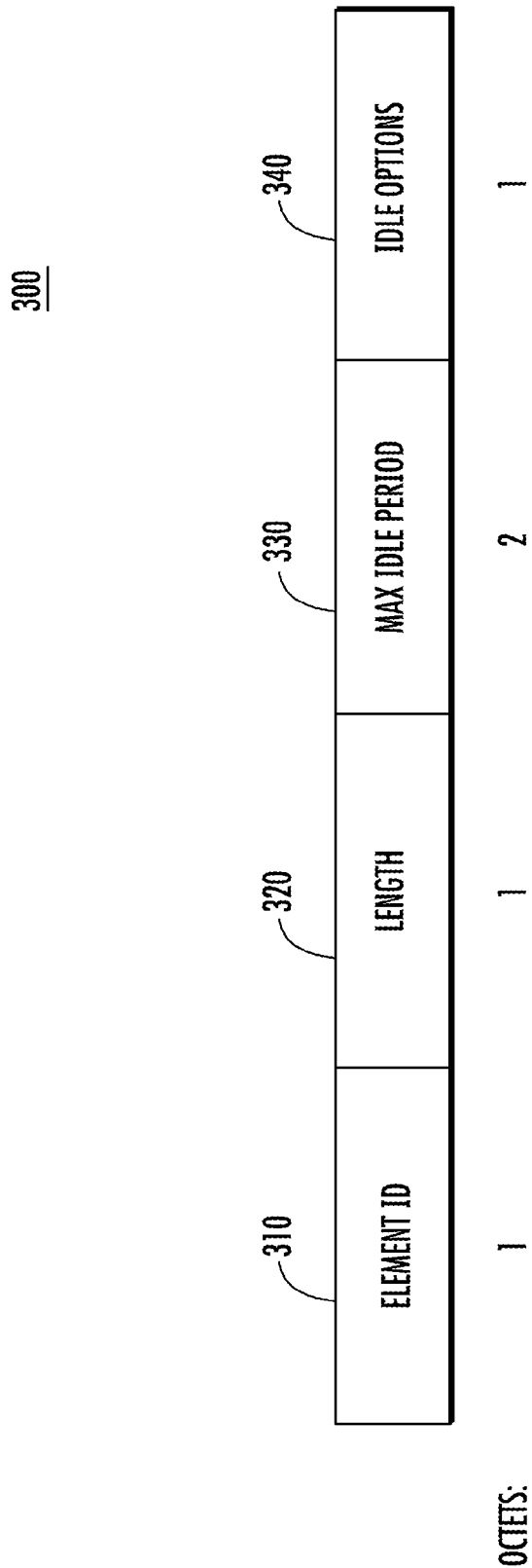
FIG. 3 is a block diagram illustrating an example Max Idle Period element.

An example BSS Max Idle Period element 300 is shown in FIG. 3. The BSS Max Idle Period element 300 may include an element ID field 310, a length field 320, a Max Idle Period field 330, and an Idle Options field 340. BSS Max Idle period management may enable an AP to indicate a time period during which the AP does not disassociate a STA due to non-receipt of frames from the STA. The BSS Max Idle Period element may contain the time period a non-AP STA can refrain from transmitting frames to the AP before the AP disassociates the STA due to inactivity. The BSS Max Idle Period element 300 may be included in Association Response frames and Reassociation Response frames.

Disassociation may be initiated by either party in an association, for example the AP or the non-AP STA may initiate a disassociation procedure. Disassociation may be a notification of disassociation, not a request to disassociate. Disassociation may not be permitted to be refused by the receiving STA except when management frame protection is negotiated and the message integrity check fails.

In IEEE 802.11r, for example, the Fast BSS Transition mechanism may provide a means for a STA to set up security and QoS parameters prior to reassociation to a new AP. This mechanism may allow for removal of time-consuming operations from a time-critical reassociation process.

Fast BSS Transition may occur over the air or over a distribution system (DS) and may be initiated by a non-AP STA, which may be referred to as the Fast BSS Transition Originator (FTO). The BSS Transition capability may enable improved throughput, effective data rate and/or QoS for the aggregate of STAs in a network by shifting (via transition) individual STA traffic loads to more appropriate points of association within the extended service set (ESS). An example scenario where such improvements may be made may include a STA associated with an AP near its cell edge. The STA may thus only transmit and receive using a relatively low modulation and coding scheme (MCS). Fast BSS Transition may enable the STA to transition to a closer AP (permitting use of a higher MCS, improving data rate and/or QoS) without incurring the overhead penalties that would otherwise be associated with the transition. Similar situations are further discussed later herein.

Figure 4:
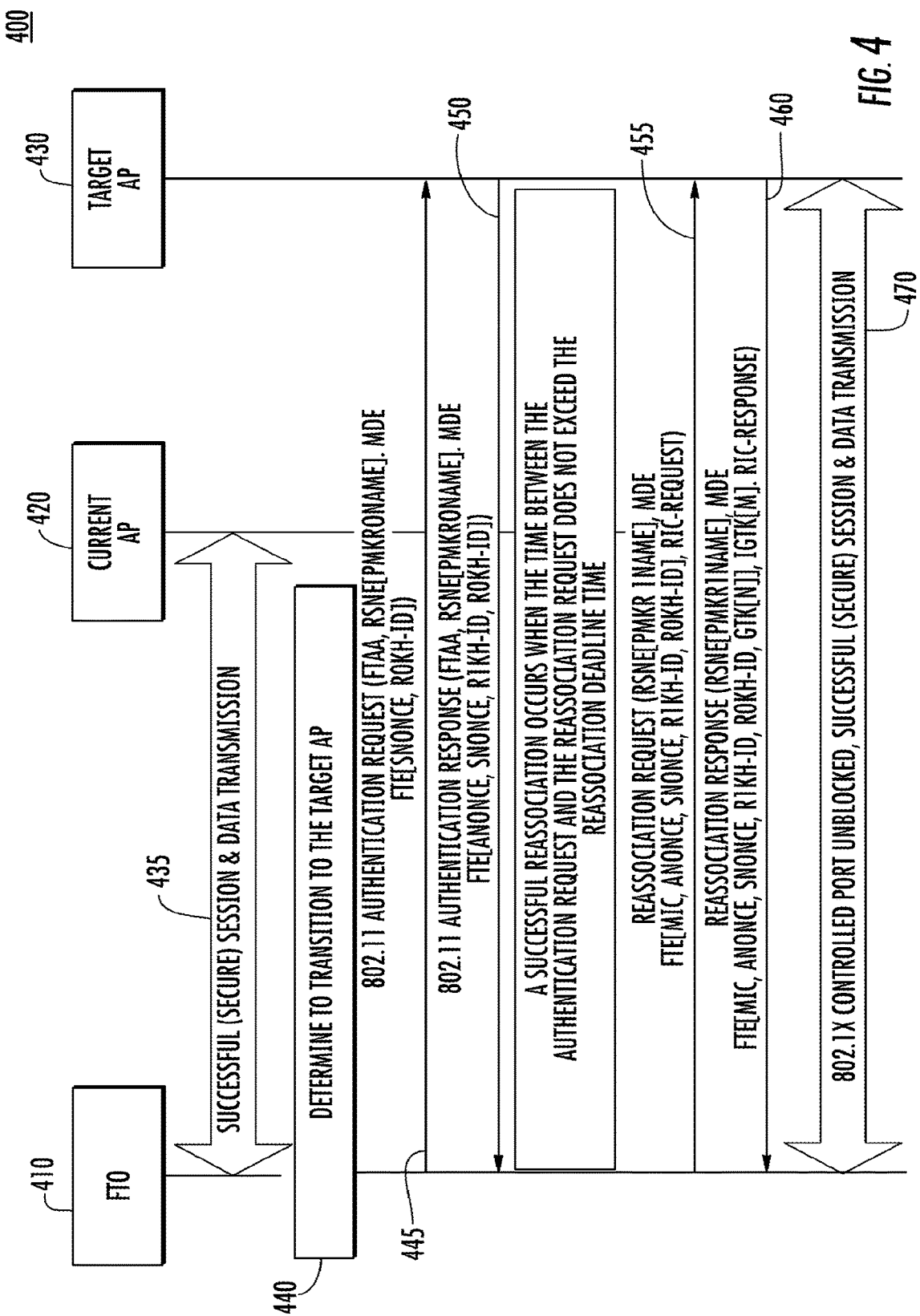
FIG. 4 is a signaling diagram illustrating an example over-the-air Fast BSS Transition Protocol.

FIG. 4 is a diagram of an example over-the-air Fast BSS Transition protocol 400. Referring to FIG. 4, a BSS may include an FTO 410, a current AP 420, and a target AP 430. In this example, a secure session and data transmission 435 may be set up between the FTO 410 and the current AP 420. The FTO 410 may determine 440 that it needs to transition to the target AP 430 and transmit an IEEE 802.11 Authentication Request 445. The target AP 430 may transmit an IEEE Authentication Response 450 in response to the IEEE Authentication Request 445. The FTO 410 may transmit a Reassociation Request 455 to the target AP 430 in response to receiving the IEEE Authentication Response 450. A successful reassociation may occur when the time between the IEEE 802.11 Authentication Request 445 and the Reassociation Request 455 does not exceed a Reassociation Deadline Time. The target AP 430 may transmit a Reassociation Response 460 to the FTO 410 in response to the Reassociation Request 455. In response to receiving the Reassociation Response 460, the 802.1X controlled port may be unblocked, and a successful and secure session and data transmission 470 may occur between the FTO 410 and the target AP 430.

Figure 5:
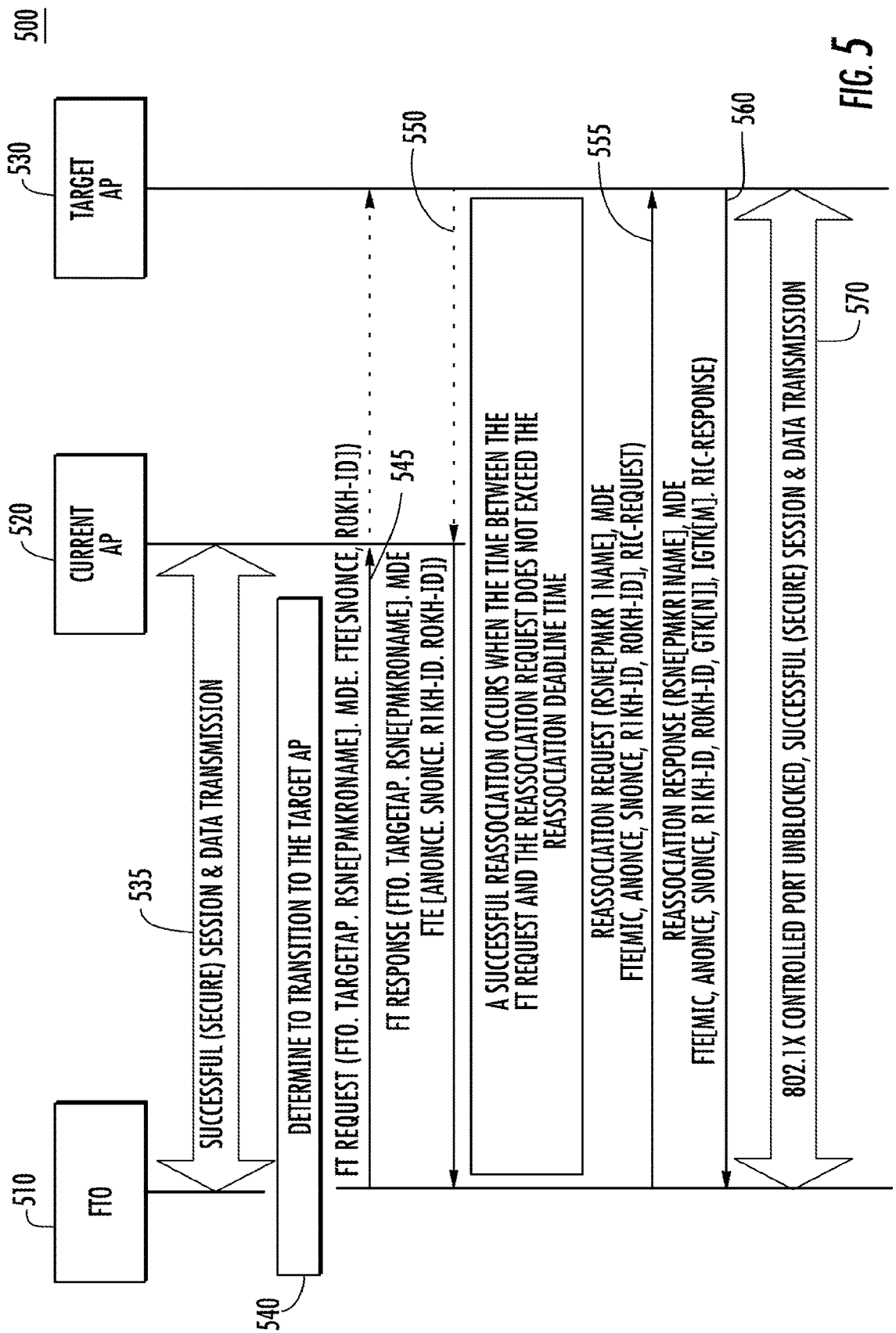
FIG. 5 is a signaling diagram illustrating an example over-the-distribution system (DS) Fast BSS Transition Protocol.

FIG. 5 is a diagram of an example over-the-DS Fast BSS Transition protocol 500. Referring to FIG. 5, a BSS may include an FTO 510, a current AP 520, and a target AP 530. In this example, a secure session and data transmission 535 may be set up between the FTO 510 and the current AP 520. The FTO 510 may determine 540 that it needs to transition to the target AP 530 and transmit an FT Request 445 to the current AP 520 which may forward the FT Request 445 to the target AP 530. The target AP 530 may transmit an FT Response 550 in response to the FT Request 545 to the current AP 520 which may forward the FT Response 550 to the FTO 510. The FTO 510 may transmit a Reassociation Request 555 to the target AP 530 in response to receiving the FT Response 550. A successful reassociation may occur when the time between the FT Request 545 and the Reassociation Request 555 does not exceed a Reassociation Deadline Time. The target AP 530 may transmit a Reassociation Response 560 to the FTO 510 in response to the Reassociation Request 555. In response to receiving the Reassociation Response 560, the 802.1X controlled port may be unblocked, and a successful and secure session and data transmission 570 may occur between the FTO 510 and the target AP 530.

A non-AP STA may transmit a BSS Transition Management Query to its AP to request a list of BSS Transition Candidates. An AP may transmit a BSS Transition Management Request to its associated STAs. The BSS Transition Management Request frame may be unsolicited or a response to a BSS Transition Management Query.

Figure 6:
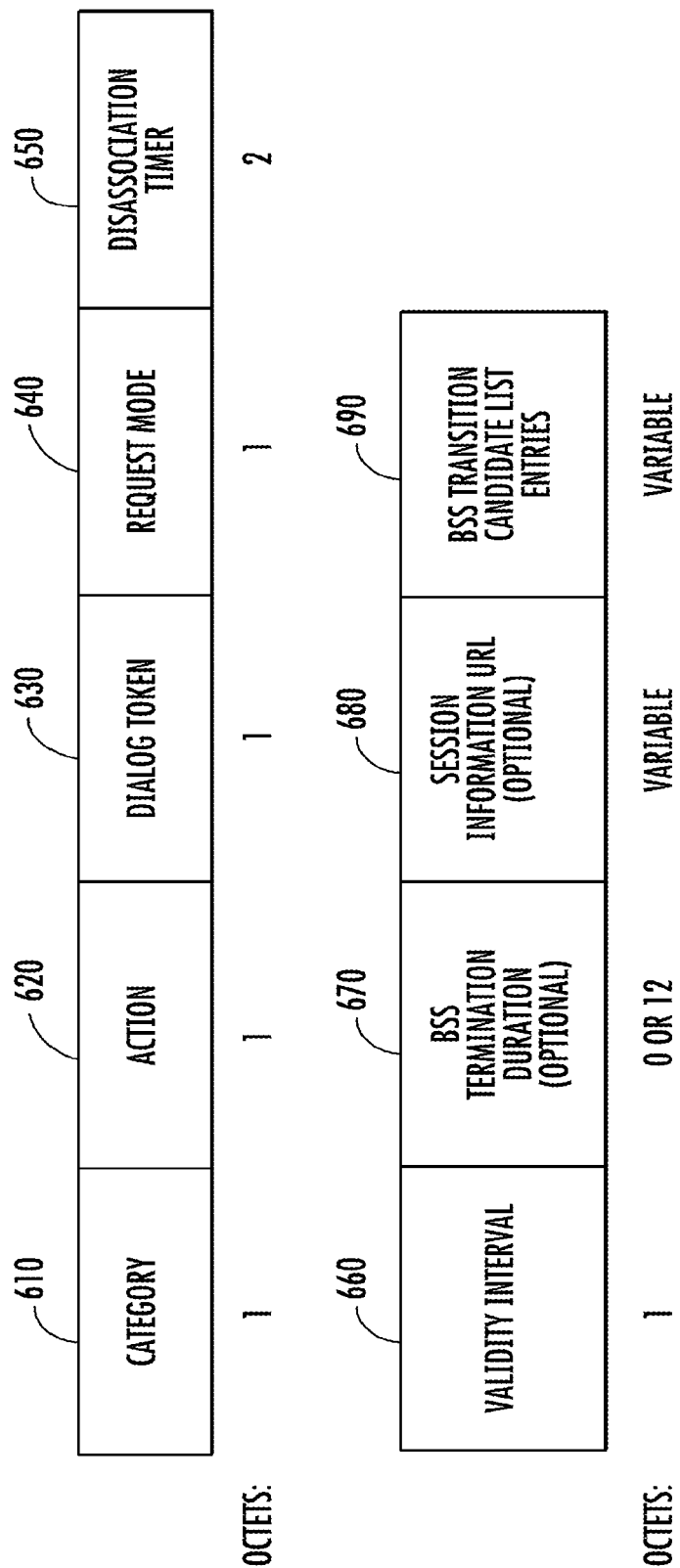
FIG. 6 is a block diagram illustrating an example BSS Transition Management Request Frame.

An example BSS Transition Management Request frame 600 is shown FIG. 6. The BSS Transition Management Request frame 600 may include a category field 610, an action field 620, a dialog token field 630, a request mode field 640, a disassociation timer field 650, a validity interval 660, a BSS termination duration field 670, a session information URL field 680, and a BSS transition candidate list entries field 690.

Figure 7:
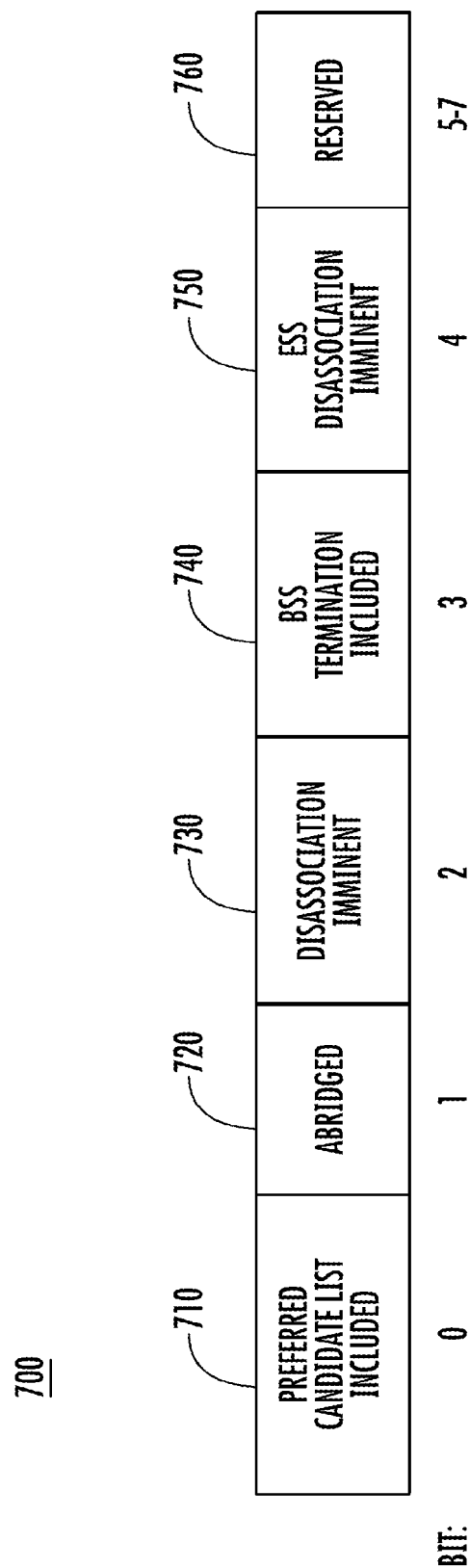
FIG. 7 is a block diagram illustrating an example Request Mode field.

FIG. 7 is a diagram of an example Request mode field 700 of the BSS Transition Management Request frame 600. The Request mode field 700 may include a preferred candidate list included element 710, an abridged element 720, a disassociation imminent element 730, a BSS termination included element 740, an ESS disassociation imminent element 750, and a reserved element 760.

Figure 8:
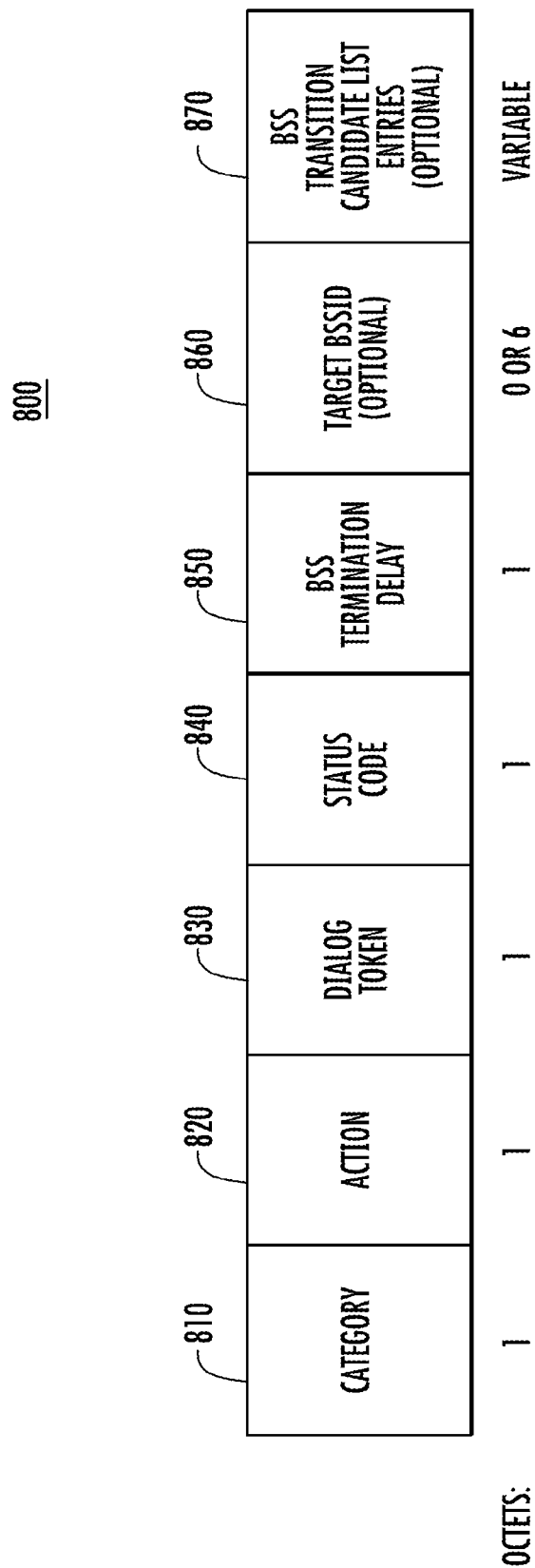
FIG. 8 is a block diagram illustrating an example BSS Transition Management Response Frame.

FIG. 8 is a diagram of an example BSS Transition Management Response frame 800. The non-AP STA may respond by transmitting a BSS Transition Management Response frame 800 to either accept the BSS Transition or indicate a reason for rejecting a transition. The BSS Transition Management frame 800 may include a category field 810, an action field 820, a dialog token field 830, a status code field 840, a BSS termination delay field 850, a target BSSID field 860, and a BSS transition candidate list entries field 870.

Figure 9:
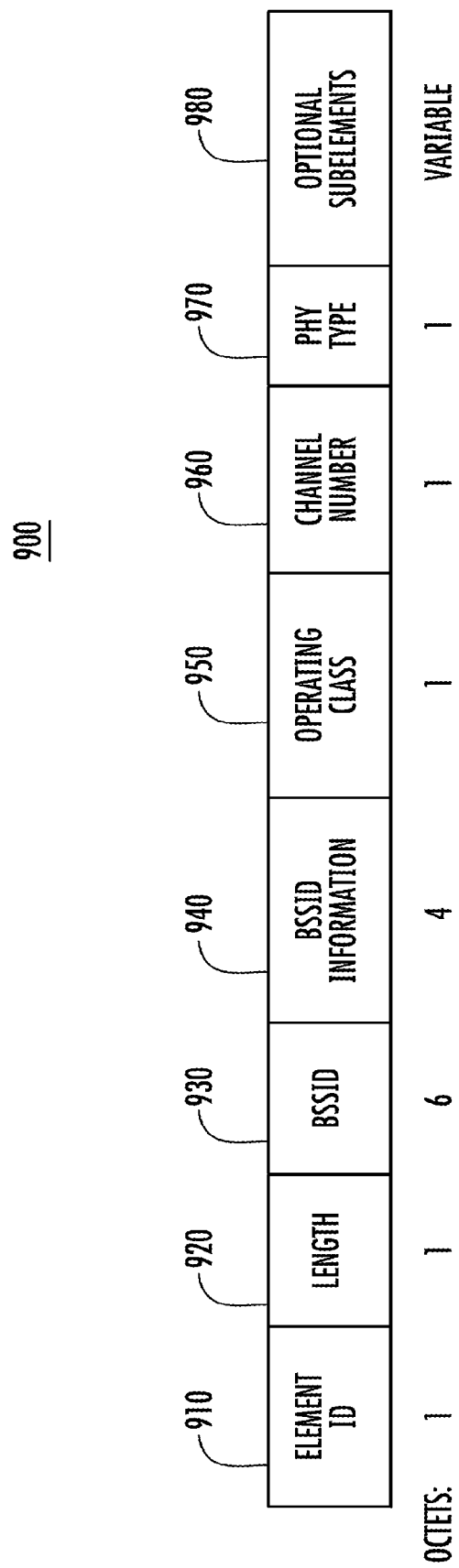
FIG. 9 is a block diagram illustrating an example Neighbor Report Element.

The BSS transition candidate list entries field 870 may contain one or more Neighbor Report elements. FIG. 9 is a diagram of an example Neighbor Report element 900. The Neighbor Report element 900 may include an element ID field 910, a length field 920, a BSSID field 930, a BSSID information field 940, an operating class field 950, a channel number field 960, a PHY type field 970, and one or more optional fields 980.

Figure 10:
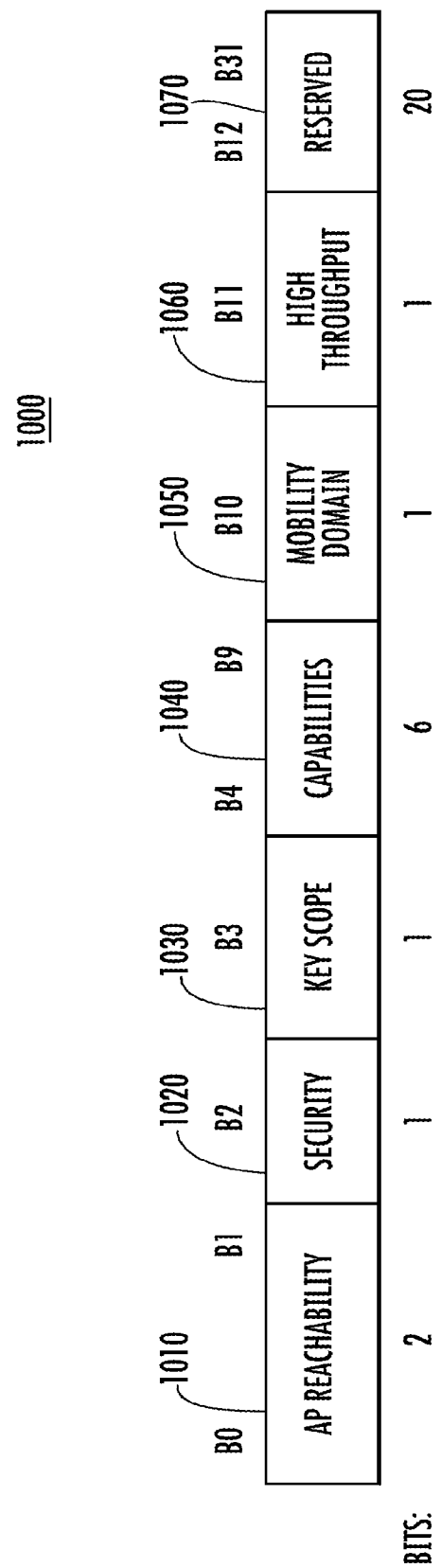
FIG. 10 is a block diagram illustrating an example BSSID information field.

FIG. 10 is a diagram of an example BSSID Information field 1000 that may be used to help determine neighbor service set transition candidates. The BSSID Information field 1000 may be 4 octets in length and contain an AP Reachability subfield 1010, a security subfield 1020, a key scope subfield 1030, a capabilities subfield 1040, a mobility domain subfield 1050, a high throughput subfield 1060, and a reserved subfield 1070.

In dense deployment scenarios targeted by HEW, network/BSS transitions may be expected to be numerous and frequent due to the potential for a small BSS size, the association of a large number of STAs, and modest mobility. The management frames needed for the numerous network transitions, particularly with the potential to occur in a bursty fashion (such as during game half-time in a stadium scenario) may consume a large amount of resources, leaving very little, if any, resources for data traffic. Methods may be needed to reduce management frames and other types of frames on the wireless medium associated with increased need of WiFi Network Transitions.

Some STAs may remain associated with their AP even when they exhibit low SNR or SNIR cell edge regime indicating that they may be fairly far removed from the AP. Consequently, they may only transmit and receive using a lower MCS and may be prone to many retries. This example scenario may lead to a reduced aggregated throughput in the network and low MAC efficiency. Methods may be performed to enable the potential for network transitions for disadvantaged STAs to increase the MAC efficiency and network performance.

STAs may enter long sleeping periods to conserve energy. In order to accommodate power efficiency, APs may provide settings for a maximum idle period that may be as long as days. Long sleeper STAs may leave the BSS after association without notifying the AP, consequently, the AP may be required to maintain records and resources, such as a TIM/buffer for these STAs, leading to the potential of wasted resources if the AP is located at locations with a large number of transient STAs (e.g., stadium, outdoor hotspot, outdoor public events, etc.). Methods may be performed for APs to effectively manage network transitions for STAs that may become long sleepers. Methods may also be performed by APs and STAs to reduce messaging overhead associated with network transitions to facilitate higher power efficiency.

Figure 11:
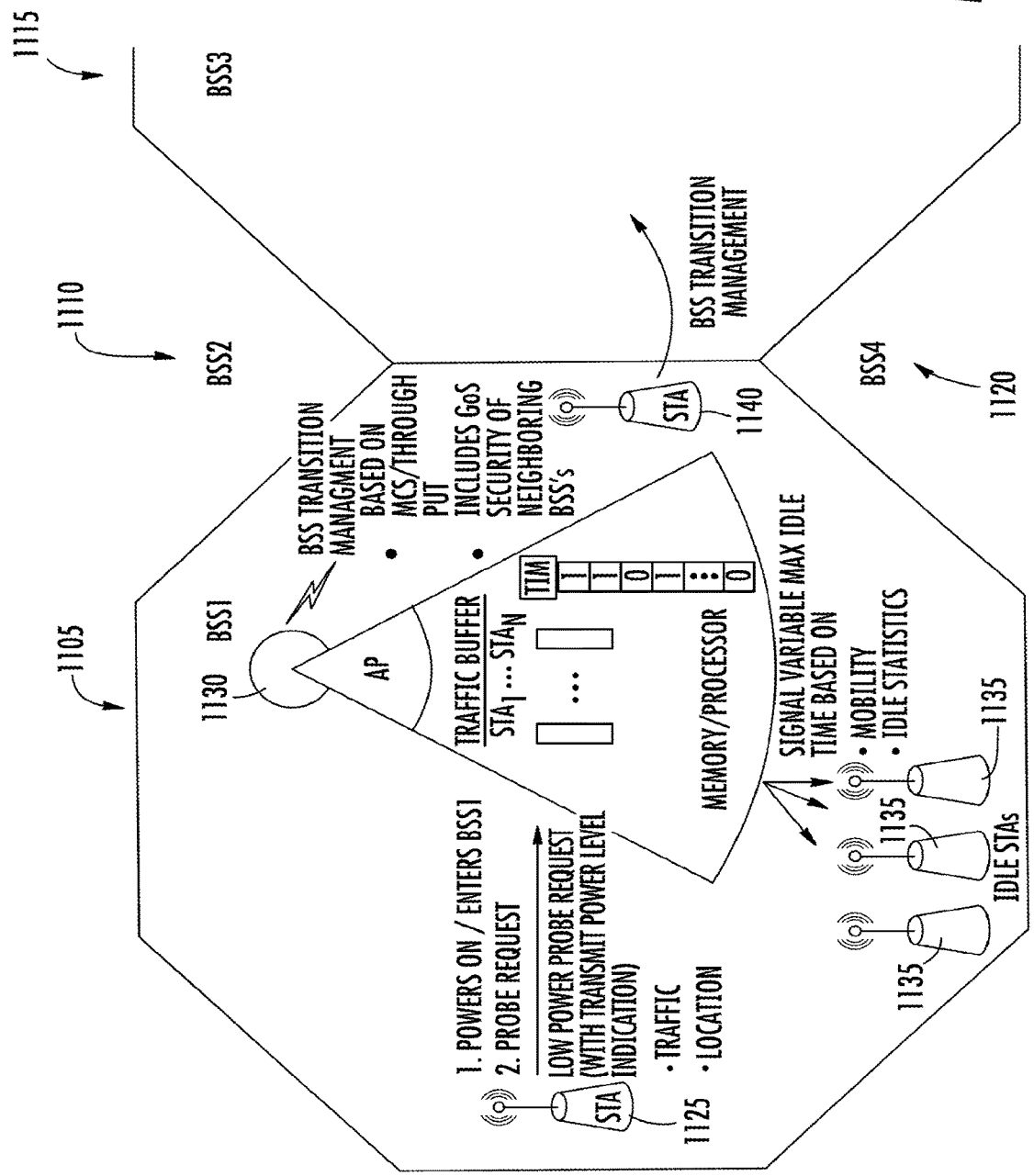
FIG. 11 is a diagram of an example BSS configured to use reduced messaging.

FIG. 11 is a diagram of an example BSS configured to use reduced messaging. In this example, a BSS 1105 is shown with neighbor BSS 1110, neighbor BSS 1115, and neighbor BSS 1120. BSS 1105 may include a scanning STA 1125 and an AP 1130. BSS 1120 may also include one or more STAs 1135 and/or a STA 1140 that may be a candidate for transition to another BSS, for example, BSS 1110, BSS 1115, or BSS 1120. In this example, one or more BSSs may be overlapping, and the number of probe responses may be reduced when a STA is located within the range of more than one AP.

In one example, the number of Probe Response frames may be reduced by reducing the number of Probe Request frames that AP may receive or should process as valid probe request frames. In this example, scanning STA 1125 may power on or enter BSS 1105. One method to reduce the number of Probe Request frames that AP may receive or process as valid probe request frames may be to use an appropriately lower transmit power for Probe Request frames instead of using full transmit power. The scanning STA 1125 may make a determination for using a lower transmit power, and/or a lower Probe Request transmit power level, based on one or more of several methods and associated criteria.

For example, the scanning STA 1125 may consider the amount of ongoing traffic in the network, for example medium load, to make the determination for using a lower transmit power, and/or a lower Probe Request transmit power level. In this example, the determination may be based on the AP density or BSS density in the vicinity of the scanning STA 1125 and may be performed by monitoring beacon reports from the APs. In another example, the density of STAs in the vicinity of the scanning STA 1125 may be determined from an assessment of the group ID parameters, or associated measurements. These examples may be performed separately or in combination.

In another example, the option and parameters of using a lower transmit power level for the Probe Request frame may be provided/signaled by the AP in previously received Beacon frames, Probe Response frames, Association Response frames, and/or Reassociation Response frames or any management, control, Null Data Packet (NDP), data, or extension frames.

In another example the scanning STA 1125 may make a decision for using a lower transmit power, and/or a lower Probe Request frame transmit power level based on its location, such as a city center with many densely deployed networks, or its location relative to the AP(s) in its vicinity, and/or time, for example with knowledge of historical location data/trends. For example, if the scanning STA 1125 has the knowledge of its current location such as a known busy area, dense deployment area, city center, or shopping mall, etc., it may use lower transmit power Probe Request frames, and associated transmit power procedures accordingly. In another example, the scanning STA 1125 may determine locations of interest through the use of a location database which may be accessible from communications with the AP. A beacon frame may indicate relevant location data to the scanning STA 1125 for the purposes of managing Probe Response frame procedures.

In another example, the scanning STA 1125 may start the transmission of the Probe Request frames with an initial, such as a moderate, transmit power level, and adjust it up or down based on statistics such as the number of received Probe Response frames, and/or the link quality of APs associated with the received Probe Response frames. Example embodiments may include determining the initial transmit level for the start of the Probe Request frames using a priori information, provided for example, by signaling from the AP(s); and/or using a variable transmit power that may be a configurable capability enabled or disabled through signaling from the AP, which may be before, during or after association with the AP.

In another example, rather than adjusting the transmit power level, the minimum and/or maximum transmit power capability of the scanning STA 1125 may be changed or incremented between association attempts with the AP(s). The AP may use the transmit power capability information from the scanning STA 1125 to determine whether to associate with the scanning STA 1125. A denial by the AP to associate with the scanning STA 1125 may be considered by the scanning STA 1125 as a trigger for increasing its maximum power capability information during a later association and/or transition attempt.

In order to facilitate appropriately lower transmit power for Probe Request frames, new fields may be defined in a message. The message may be, for example, a MLME-SCAN.request primitive, and may include a transmit power level of a Probe Request frame, which may include either an absolute or a relative transmit power level. For example, the relative transmit power level may be signaled as −N dB lower than the full transmit power level, and an Initial transmit power level of Probe Request frame, which may also include power up/down step size if power ramping is used for Probe Request frame. The message may include an indicator that indicates a Scan Type.

In another example, AP 1130 may signal a variable Max Idle Time to reduce signaling in the BSS. The Max Idle Time may be based on the mobility and/or idle statistics of the idle STAs 1135.

The AP 1130 may perform BSS transition management to allow or force STA 1140 to transition to a neighboring AP. The BSS transition management may be based on an MCS or throughput of the BSS. The AP 1130 may include the QoS Security of the neighboring BSSs to aid STA 1140 in a transition to a neighboring BSS.

Figure 12:
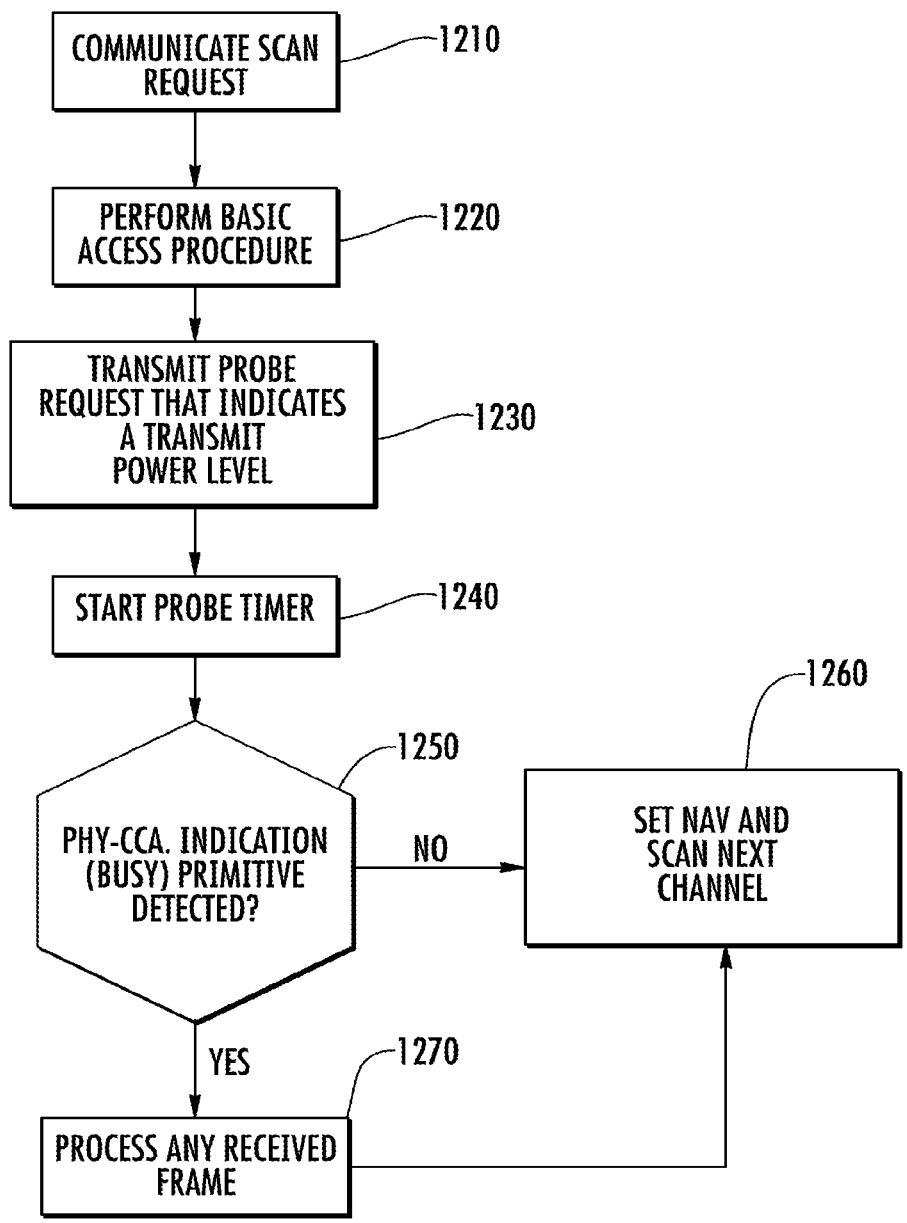
FIG. 12 is a diagram of an example method for performing active scanning with varying transmit power level.

FIG. 12 is a diagram of an example method 1200 for performing active scanning with varying transmit power level. Referring to FIG. 12, a STA may communicate a message, for example, a scan request 1210. For example, the scan request 1210 may be an active scan request or an active scan request primitive. In a passive scan example, communicating the message may include receiving an active scan request or receiving an active scan request primitive. The message may be communicated within a protocol stack of the STA. The protocol stack of the STA may include, for example a MAC Layer Management Entity (MLME) and a Physical Layer Management Entity (PLME). In one example, the message may be communicated between the MLME and the PLME. Upon communication of a message that includes a Scan Type indicator that indicates an active scan, a STA may, for each channel to be scanned, wait until a ProbeDelay time has expired or a PHYRxStart.indication primitive has been communicated and perform a Basic Access procedure 1220.

A Probe Request frame may be transmitted 1230 to the broadcast or individual destination address. The Probe Request frame may contain a field or subfield or information that indicates the transmit power level at which the Probe Request frame is transmitted. For example, such an transmit power indication or information may be a part of the PLCP header, MAC header, frame body, FCS, scrambling seeds, a field or subfield, etc. When the SSID List is present in the communicated message, the STA may transmit one or more Probe Request frames, each with an SSID indicated in the SSID List and the BSSID from the communicated message. If the Transmit power level of the Probe Request frame, or initial transmit power level of Probe Request frame and power up/down step size, is indicated in the communicated message, each Probe Request frame may be transmitted with the indicated transmit power level. In a passive scan example, the STA may not transmit a Probe Request frame.

The STA may set a ProbeTimer to 0 and start the ProbeTimer 1240. If a PHY-CCA.indication (busy) primitive has not been detected before the ProbeTimer reaches MinChannelTime 1250, then the STA may set the NAV to 0 and scan the next channel 1260, else while the Probe Timer is less than the MaxChannelTime, the STA may process any received frame 1270. For example, the STA may process any received probe responses; process any received Beacons, measurement pilots and FILS Discovery frames if dot11FILSActivated is true in the STA. If dot11FILSActivated is true in the STA, ReportingOption is IMMEDIATE, and new AP or new information of the AP is detected, the STA may issue a MLME-SCAN.confirm primitive with the ResultCode equal to INTERMEDIATE_S-CAN_RESULT and the BSSDescriptionSet containing information of the detected AP. If dot11FILSActivated is true and the ReportingOption is CHANNEL_SPECIFIC, the STA may issue at the time when the Probe Timer reaches the MaxChannelTime an MLME-SCAN.confirm primitive, with the ResultCode equal to INTERMEDIATE_ SCAN_RESULT and the BSSDescriptionSet containing information of all APs that that have been discovered from the scanned channel. The STA may then set NAV to 0 and scan the next channel 1260.

Figure 13:
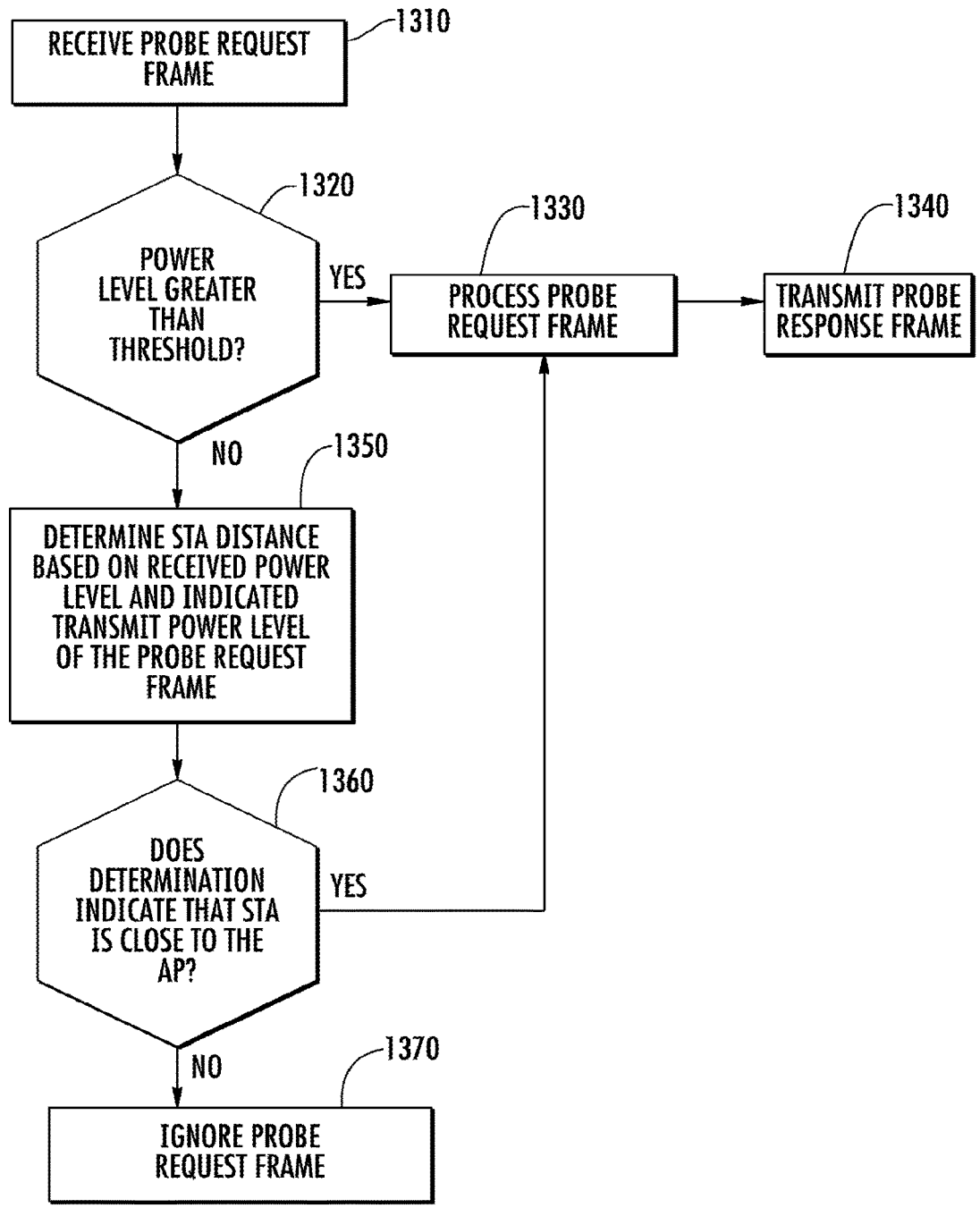
FIG. 13 is a diagram of an example method for the AP to limit the Probe Response frames.

FIG. 13 is a diagram of an example method 1300 for the AP to receive, process, and limit the Probe Response frames by responding to only received Probe Request frames whose received power is larger than a received power threshold. For example, the received power may be measured using RCPI, SINR, SNR, or any other measurement. The received power threshold may be the RCPI limit field of the FILS Request Parameters element in the received Probe Request frame or any other threshold. Referring to FIG. 13, the AP may receive a Probe Request frame from a STA 1310, and the received Probe Request frame may include a field that indicates the transmit power level of the Probe Request frame. The AP may use the indicated transmit power level of the Probe Request frame and the actual power level of the received Probe Request frame to determine the relative location of the STA or the distance of the STA from the AP. Upon receiving a Probe Request frame from a STA, the AP may determine a power level of the received Probe Request frame 1320. If the power level of the received Probe Request frame is greater than a threshold, the AP may process the Probe Request frame 1330 and may transmit a Probe Response frame 1340. If the power level of the received Probe Request frame is less than a threshold, the AP may determine the STA distance based on the received power level and the indicated transmit power level of the Probe Request frame 1350. For example, the AP may estimate the pathloss and determine that the STA is close in proximity to the AP if the difference in received power level and the indicated transmit power level of the Probe Request Frame are similar values or within a predetermined range. If the values of the received power level and the indicated transmit power level of the Probe Request Frame are disparate or the difference is greater than a predetermined range, then the AP may determine that the STA is not close in proximity to the AP. If the AP determines 1360 that the STA is close to the AP, the AP may process the received Probe Request frame 1330 and transmit a Probe Response frame 1340. If the AP determines 1360 that the STA is not close to the AP, the AP may ignore the Probe Request frame 1370. In addition, the AP may determine to ignore a legacy probe request. In some examples, the AP may determine to process a legacy probe request.

There may be several possible methods for an AP and scanning STA to take into account the impact of the varying transmit power of the Probe Request frame. For example, a Transmit Power field may be added to the FILS Request Parameters element in Probe Request frame. This Transmit Power field may be the actual transmit power level used to transmit this Probe Request Frame. The scanning STA may still set the RCPI limit in the FILS Request Parameters element as if the Probe Request frame is transmitted with full Tx power. Upon receiving the Probe Request frame and its FILS Request Parameters element, the AP may calculate the difference between the actual TX power of Probe Request frame and the full Tx power and subtract it from the RCPI limit field in the FILS Request Parameters element to obtain a new effective RCPI limit. For example, the actual TX power of Probe Request frame may be 5 dB lower than the full Tx power. In this case, the effective RCPI limit calculated by the AP may be equal to RCPI limit −5 dB. The AP may use the derived effective RCPI limit as the power threshold and may only process the Probe Request frame and respond with a Probe Response frame if the received RCPI level of the Probe Request exceeds the effective RCPI limit.

In another example, the scanning STA may set the RCPI limit in the FILS Request Parameters element considering the actual TX power of Probe Request frame. The STA may calculate the difference between the actual TX power of Probe Request frame and the full Tx power and subtract it from the RCPI limit field corresponding to the full Tx power to obtain a new RCPI limit. For example, if the actual TX power of Probe Request frame is 3 dB lower than the full Tx power, then the new RCPI limit calculated by the scanning STA may equal RCPI limit −3 dB. The scanning STA may use the RCPI limit in the FILS Request Parameters element in the Probe Request frame.

In yet another example, the scanning STA may include a Transmit Power field in the Probe Request frame. The AP, receiving such a Probe Request frame, may estimate the distance between itself and the scanning STA by using the value in the Transmit Power field and the received power of the Probe Request. The AP may respond with a Probe Response frame if it determines that the scanning STA is close by based on the transmit power and the received power of the Probe Request frame.

Various techniques may be employed to enhance BSS transition management. For example, where a BSS Transition Management frame is used for AP-driven disassociation, one or more reserved bits in the Request Mode subfield may be used by the AP to indicate a reason for the BSS transition. The reason may include for example low performance; low MCS; high retry count; undesirable settings (such as power saving, sleeping schedule), etc.

In another example, security and/or QoS setup related information may be added in BSS Transition management. One possibility may be that the AP may set the "Disassociation imminent" bit in the Request Mode in the BSS Transition Management Request frame to be 1, and set the "Preferred Candidate List Included" bit to be 1 as well. Another possibility may be that the BSS Transition Candidate List Entries field may contain one or more Neighbor Report elements. Another possibility is to add security and/or QoS setup related information of each BSS included in the preferred candidate list in each Neighbor Report element. One approach for this may be to include this information in the BSSID information field of the Neighbor Report element, as follows. For example, when a "Security" bit in the BSSID information field is set to 0, several reserved bits of the BSSID information subfield may be reused to carry security related information of candidate BSS/AP.

Figure 14:
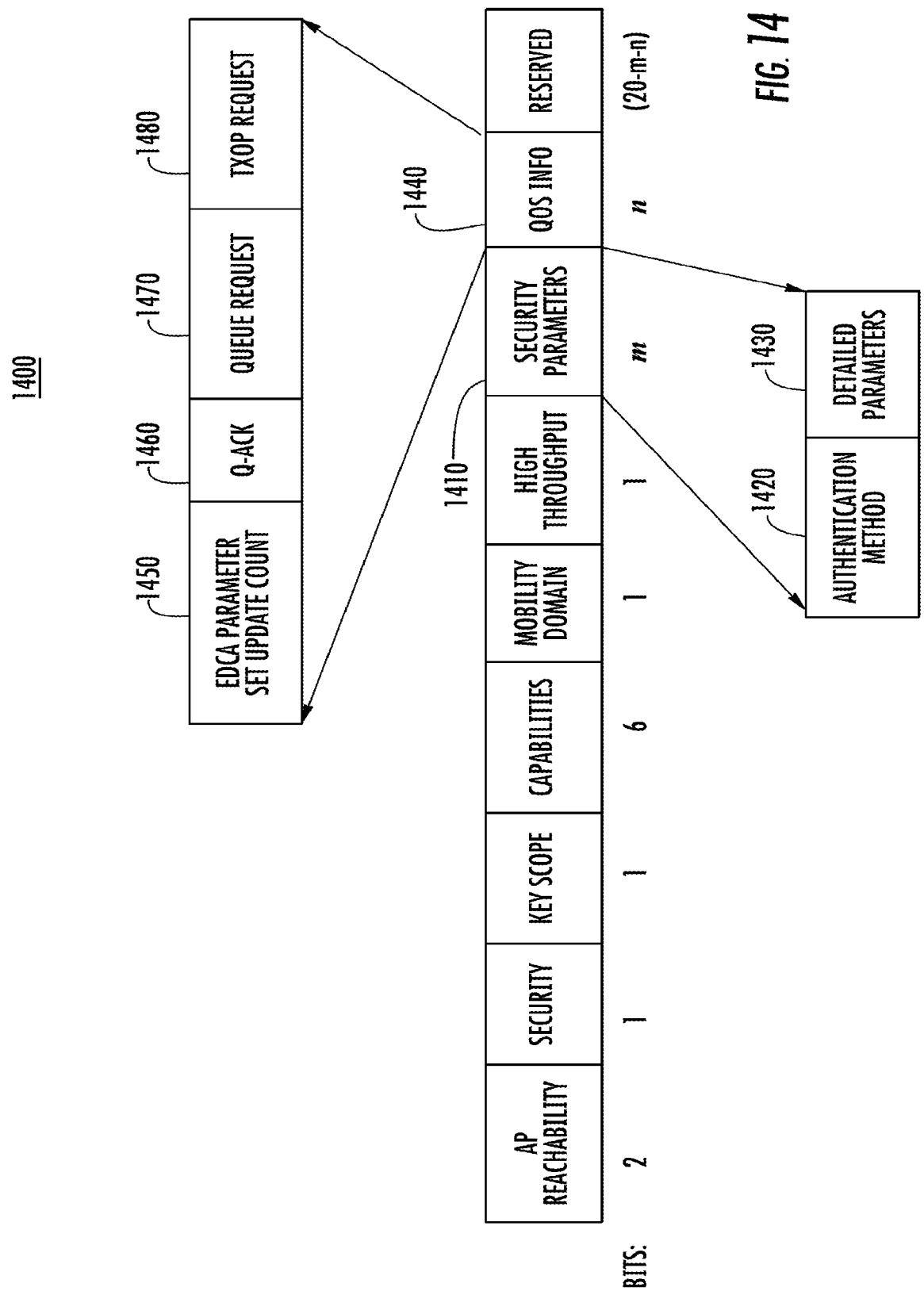
FIG. 14 is a block diagram illustrating an example BSSID information field and example QoS and security subfields.

FIG. 14 is a diagram of an example BSSID information field 1400 with subfields added for QoS and security. Several reserved bits of the BSSID information subfield may be reused to carry QoS Setup related information of candidate BSS/AP.

The security parameters field 1410 in the BSSID information field 1400 may contain two subfields. The first subfield may be an Authentication Method subfield 1420. The Authentication Method subfield 1420 may use 3 bits to indicate the five authentication methods defined in IEEE 802.11, i.e. Open System authentication, Shared Key authentication, FT authentication, Simultaneous authentication of equals (SAE), and FILS authentication. The second subfield may be a Detailed Security Parameters subfield 1430. The Detailed Security Parameters subfield 1430 may include parameters associated with the indicated authentication method. For example, for FILS authentication method, the following example detailed parameters/configuration may be signaled in this field: the FILS authentication exchange using a TTP is performed without PFS; the FILS authentication exchange using a TTP is performed with PFS; or the FILS authentication exchange without a TTP and with PFS. The QoS Info field 1440 may include an EDCA Parameter Set Update Count subfield 1450, a Q-Ack subfield 1460, a Queue Request subfield 1470, and a TXOP Request subfield 1480.

Figure 15:
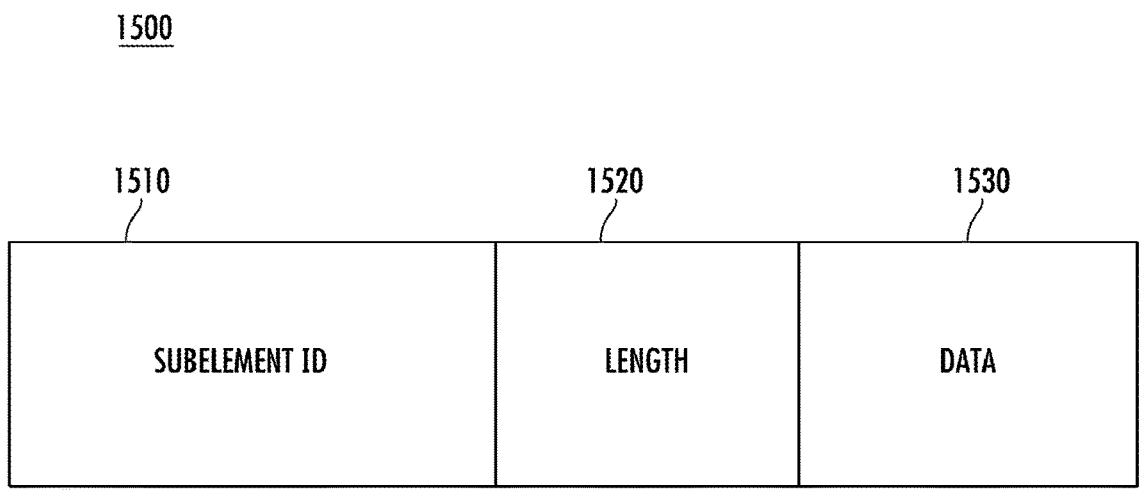
FIG. 15 is a block diagram illustrating an example format of a subelement field.

Alternatively, security and/or QoS setup related information of each BSS included in the preferred candidate list can be added to the Optional subelements field in the Neighbor Report element. The Security parameters field 1410 and QoS Info field 1440, may be defined, and may follow a subelement format 1500 as shown in FIG. 15. The subelement format 1500 may include a Subelement ID field 1510, a Length field 1520, and a Data field 1530. In this example, the Subelement ID field 1510 may be an ID indicating that the current subelement is a Security parameters or QoS info subelement. The Length field 1520 may be a field containing the length of the corresponding Security parameters or QoS info subelement. The Data field 1530 may include the actual contents of the corresponding Security parameters or QoS info subelement, which may use the same design as the Security parameters or QoS info fields in FIG. 14. The parameters may be stored for a particular session to enable fast initiation of a transition session.

Various techniques may be employed to address the problems relating to long sleep. In one example, multiple values for Max Idle Period may be used in a BSS. This may be different than the rule of one single Max idle Period setting per BSS.

In order to facilitate using multi-level Max Idle Periods in a BSS, one or several reserved bits in the Extended Capabilities element may be reused to indicate the capability to support multi-level Max Idle Periods in a BSS. An AP that allows multi-level Max Idle Periods may indicate its support of multi-level Max Idle Periods using a management frame, control frame, NDP frame, action frame or extended control frame that contains an Extended Capabilities element. Such a frame may be a broadcast frame, such as Beacon or short Beacon frame, or unicast frame such as Association Response frame or Unicast Probe Response frame.

In order to assist the AP to make decision on values of Max Idle Period to be used, a STA may provide mobility parameters and sleep statistics to AP using a Mobility and Sleep Statistics Report element in a management frame, action frame or other frames.

Figure 16:
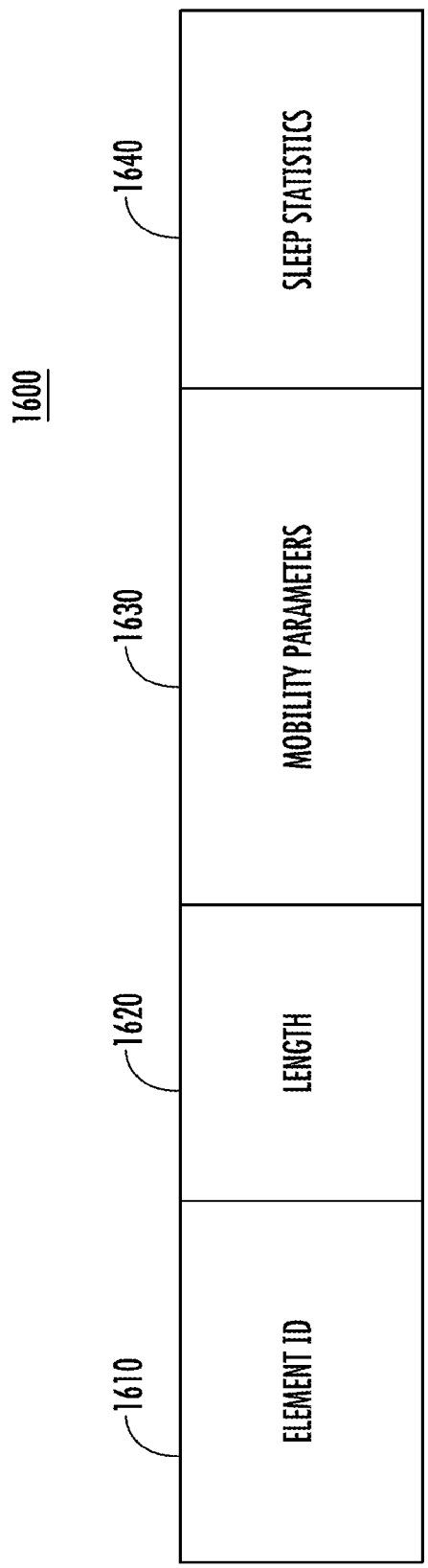
FIG. 16 is a block diagram illustrating an example Mobility and Sleep Statistics Report element.

FIG. 16 is a diagram of an example Mobility and Sleep Statistics Report element 1600. A Mobility and Sleep Statistics Report Element 1600 may include an Element ID field 1610, a Length field 1620, a Mobility Parameters field 1630, and a Sleep Statistics field 1640. The Element ID field 1610 may be an ID indicating that the current IE is a Mobility and Sleep Statistics Report Element. The Length field 1620 may be a field containing the length of the Mobility and Sleep Statistics Report Element. The Mobility Parameters field 1630 may be a field which may be used to report the mobility parameters of the STA, and may be implemented as current mobility or mobility at a different time of the day and/or at different locations. The Sleep Statistics field 1640 may be a field that may be used to report the sleep statistics of the STA, such as, its active vs. doze/sleep duty cycle and sleep duration statistics.

There may be three possible stages where the STA may signal its mobility and sleep statistics to the AP, for example, before association, during association, and after association. In the before association stage, the STA may use a frame such as Probe Request frame with the Mobility and Sleep Statistics Report Element to the AP. In the during association stage, the STA may use a frame such as an Association Request frame with the Mobility and Sleep Statistics Report Element to the AP. In the after association stage, the STA may use a management frame or action frame with the Mobility and Sleep Statistics Report Element to the AP.

An AP may provide different Max Idle Period values for different types of devices at or after association by transmitting an Association/Reassociation Response frame, a management frame, or action frame that include a BSS Max Idle Period Element. One or more reserved bits in the Idle Options field in the BSS Max Idle Period Element may be reused to signal Max Idle Period related information. For example, one reserved bit in Idle Options field can be used to indicate whether the setting of the Max Idle Period is per BSS or per STA (or STA type).

In another example, an AP may use an adaptive or heuristic method to manage Max Idle Periods of a STA in its BSS. In this case, the AP may start the Max Idle Period management for a STA by providing a short Max Idle Period in the beginning (after association). This may depend on a known environment, for example Max Idle Periods in the order of game time in a stadium, and may depend on the mobility pattern of the STA.

The AP also may gradually increase the Max Idle Period for STAs that remain in the BSS and prefer to sleep. During the STA's stay in the BSS, AP may adjust (increase or decrease) the Max Idle Period for the STA based on its mobility, sleep statistics and load in the BSS. The AP may adjust the Max Idle Period using Action or management frames containing a BSS Max Idle Period Element or a new Max Idle Period for STA element to indicate/change Max Idle Period setting for STAs. The AP may also or alternatively adjust the Max Idle Period using broadcast frames containing a BSS Max Idle Period Element or a new Max Idle Period for STA element to announce new settings of Max Idle Period for one or more types of STAs.

Figure 17:
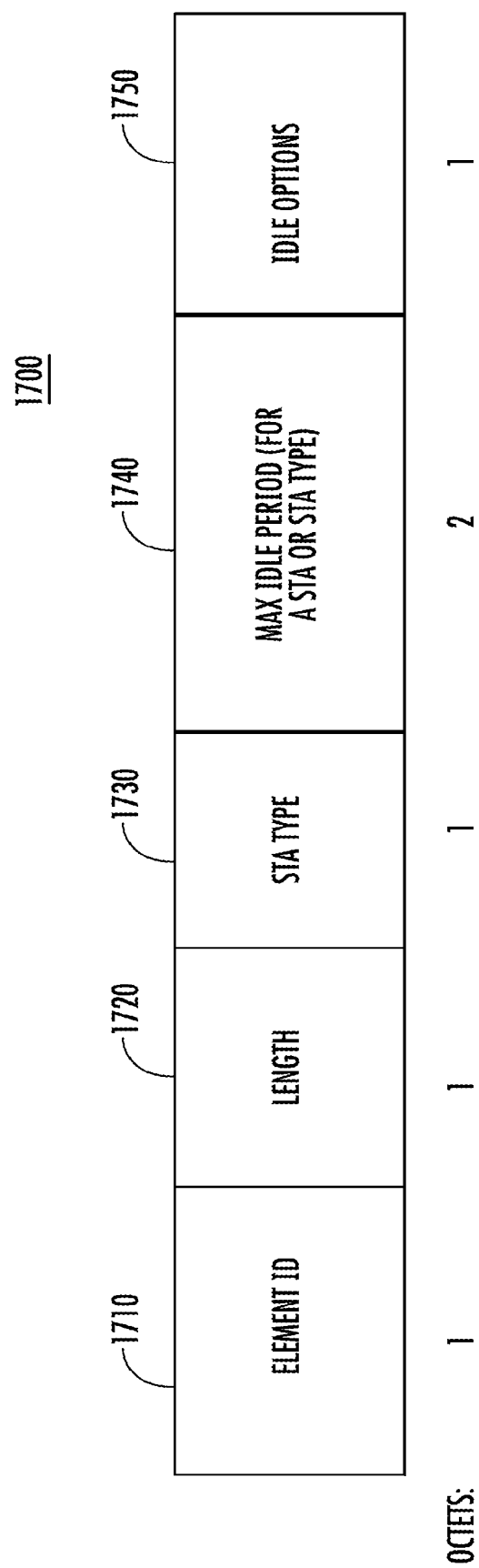
FIG. 17 is a block diagram illustrating an example Max Idle Period for STA element.

Several examples of a Max Idle Period for STA element may be possible. One example Max Idle Period for STA element, shown in FIG. 17, may be used to signal the Max Idle Period for a STA or a STA type. For example, the Max Idle Period for STA element 1700 may include an Element ID field 1710, a Length field 1720, a STA type field 1730, a Max Idle Period field 1740, and an Idle Options field 1750. The Element ID field 1710 may be an ID indicating that the current IE is a Max Idle Period for STA element. The Length field 1720 may be a field containing the length of the Max Idle Period for STA element. The STA type field 1730 may be a field indicating the type of STAs that this Max Idle Period for STA element format is for. The Max Idle Period field 1740 may be a field that indicates the time period during which a STA or STAs of a particular type can refrain from transmitting frames to its associated AP without being disassociated. The Idle Options field 1750 may be a field that contains a Protected Keep-Alive Required bit and 7 reserved bits.

Figure 18:
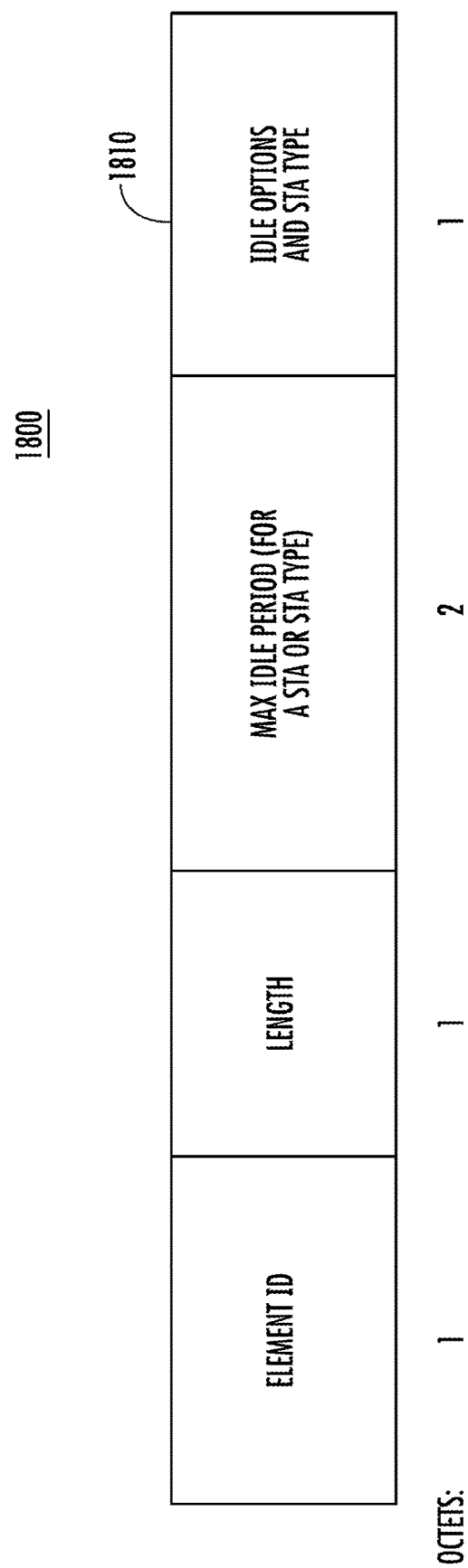
FIG. 18 is a block diagram illustrating another example Max Idle Period for STA element; and, FIG. 19 is a block diagram illustrating another example Max Idle Period for STA element.

FIG. 18 is a diagram of another example Max Idle Period for STA element 1800, and may be used to signal the Max Idle Period for a STA or a STA type. A difference from the example of FIG. 17 may be that STA types may be signaled using 7 reserved bits in the previous Idle options, therefore creating an Idle options and STA type field 1810 that may provide for efficient signaling.

Figure 19:
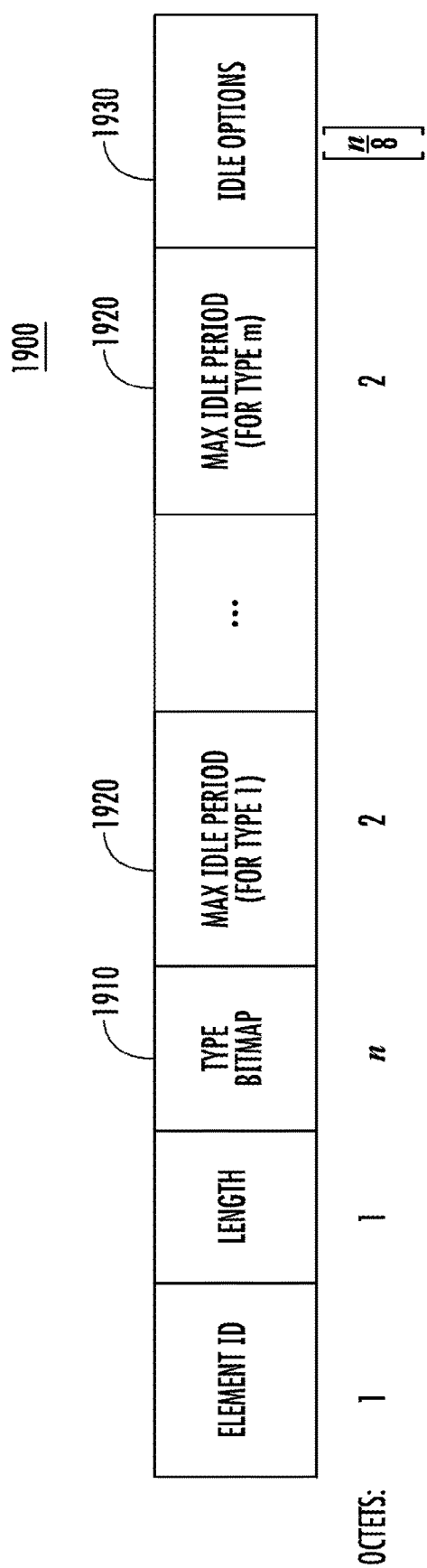

FIG. 19 is a diagram of another example Max Idle Period for STA element 1900, and may be used to signal the Max Idle Period for several STA types and may contain one or more of the following fields. In this example, the Max Idle Period for STA element 1900 may include a Type Bitmap field 1910, one or more Max Idle Period fields 1920, 1920, and an Idle Options field 1930. The Type Bitmap field 1910 may be a bitmap that indicates the types of STA whose Max Idle Period is signaled in this element. The Max Idle Period fields 1920, 1920$_n$ may signal the Max Idle Period for each type indicated in the Type Bitmap field 1910. The Idle Options field 1930 may contain one Protected Keep-Alive Required bit for each type indicated in the Type Bitmap field 1910.

Although the solutions described herein consider IEEE 802.11 specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. An Institute of Electrical and Electronics Engineers (IEEE) 802.11 access point (AP) comprising:
   a receiver configured to receive a probe request frame from an IEEE 802.11 station (STA) at a received power level;
   a processor configured to:
      on a condition that the probe request frame does not include an indication of a transmitted power level, ignore the probe request frame on a condition that the received power level is below a first threshold, and
      on a condition that the probe request frame includes an indication of transmit power, process the probe request frame on a condition that the received power level is greater than a second threshold, wherein the second threshold is based on the received power level and the indicated transmitted power level; and
   a transmitter configured to transmit a probe response frame.

2. The IEEE 802.11 AP of claim 1, wherein the processor is configured to determine that the IEEE 802.11 STA is close to the IEEE 802.11 AP based on the received power level and the transmitted power level.

3. The IEEE 802.11 AP of claim 1, wherein the receiver is configured to receive the probe request frame from the IEEE 802.11 STA via a Carrier Sense Multiple Access (CSMA) wireless medium.

4. The IEEE 802.11 AP of claim 1, wherein the probe response frame is transmitted as a broadcast frame to a plurality of IEEE 802.11 STAs.

5. The IEEE 802.11 AP of claim 1, wherein the transmitter is configured to transmit the probe response on a condition that the probe request exceeds a threshold signal to interference plus noise ratio (SINR).

6. The IEEE 802.11 AP of claim 1, wherein the transmitter is configured to transmit a message that indicates a time period during which the IEEE 802.11 AP will not disassociate an IEEE 802.11 STA due to non-receipt of frames from the IEEE 802.11 STA.

7. The IEEE 802.11 AP of claim 1, wherein a transmit power of the probe request frame is lower than full transmit power.

8. The IEEE 802.11 AP of claim 1, wherein a transmit power of the probe request frame is based on an amount of traffic in a network.

9. The IEEE 802.11 AP of claim 1, wherein the transmit power of the probe request frame is based on a density of a plurality of IEEE 802.11 APs within a scanning range of the IEEE 802.11 STA.

10. The IEEE 802.11 AP of claim 1, wherein the transmit power of the probe request frame is determined based on a density of IEEE STAs within a scanning range of the IEEE 802.11 STA.

11. A method for use in an Institute of Electrical and Electronics Engineers (IEEE) 802.11 access point (AP), the method comprising:
   receiving a probe request frame from an IEEE 802.11 station (STA) at a received power level;
   on a condition that the probe request frame does not include an indication of a transmitted power level, ignoring the probe request frame on a condition that the received power level is below a first threshold, and
   on a condition that the probe request frame includes an indication of transmit power, processing the probe request frame on a condition that the received power level is greater than a second threshold, wherein the second threshold is based on the received power level and the indicated transmitted power level; and
   transmitting a probe response frame.

12. The method of claim 11 further comprising:
   determining that the IEEE 802.11 STA is close to the IEEE 802.11 AP based on the received power level and the transmitted power level.

13. The method of claim 11, wherein the probe request frame is received from the IEEE 802.11 STA via a Carrier Sense Multiple Access (CSMA) wireless medium.

14. The method of claim 11, wherein the probe response frame is transmitted as a broadcast frame to a plurality of IEEE 802.11 STAs.

15. The method of claim 11, wherein the probe response frame is transmitted on a condition that the probe request frame exceeds a threshold signal to interference plus noise ratio (SINR).

16. The method of claim 11 further comprising:
   transmitting a message that indicates a time period during which the IEEE 802.11 AP will not disassociate an IEEE 802.11 STA due to non-receipt of frames from the IEEE 802.11 STA.

17. The method of claim 11, wherein a transmit power of the probe request frame is lower than full transmit power.

18. The method of claim 11, wherein a transmit power of the probe request frame is based on an amount of traffic in a network.

19. The method of claim 11, wherein a transmit power of the probe request frame is based on a density of a plurality of IEEE 802.11 APs within a scanning range of the IEEE 802.11 STA.

20. The method of claim 11, wherein a transmit power of the probe request frame is determined based on a density of IEEE STAs within a scanning range of the IEEE 802.11 STA.

* * * * *